(12) United States Patent
Gopal

(10) Patent No.: US 12,118,130 B2
(45) Date of Patent: Oct. 15, 2024

(54) CIRCUITRY AND METHODS FOR LOW-LATENCY EFFICIENT CHAINED DECRYPTION AND DECOMPRESSION ACCELERATION

(71) Applicant: Intel Corporation, Santa Clara, CA (US)

(72) Inventor: Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 17/214,820

(22) Filed: Mar. 27, 2021

(65) Prior Publication Data

US 2022/0309190 A1 Sep. 29, 2022

(51) Int. Cl.
*G06F 21/72* (2013.01)
*G06F 21/64* (2013.01)
*H04L 9/06* (2006.01)

(52) U.S. Cl.
CPC .............. *G06F 21/72* (2013.01); *G06F 21/64* (2013.01); *H04L 9/0643* (2013.01)

(58) Field of Classification Search
CPC ......... G06F 21/72; G06F 21/64; H04L 9/0643
See application file for complete search history.

(56) References Cited

U.S. PATENT DOCUMENTS

2019/0147172 A1* 5/2019 Chen ................. G06F 16/90344
713/193

OTHER PUBLICATIONS

Collet et al., "Zstandard Compression and the application/zstd Media Type: draft-kucherawy-dispatch-zstd-00", Network Working Group, Sep. 25, 2017, pp. 1-32.
Collet, Yann, "Zstandard Compression Format", GitHub, facebook/zstd, Version 0.3.7, Available Online at <https://github.com/facebook/zstd/blob/dev/doc/zstd_compression_format.md>, Dec. 2020, pp. 1-40.
Larabel, Michael, "Apple M1 ARM PerformanceWith A 2020 Mac Mini Review", Phoronix, Computers, Available Online at <https://www.phoronix.com/scan.php?page=article&item=apple-mac-m1&num=2>, Nov. 20, 2020, pp. 1-5.

* cited by examiner

*Primary Examiner* — Esther B. Henderson
(74) *Attorney, Agent, or Firm* — NICHOLSON DE VOS WEBSTER & ELLIOTT LLP

(57) ABSTRACT

Systems, methods, and apparatuses for low-latency page efficient chained decryption and decompression acceleration are described. In one embodiment, a processor comprises a hardware processor core, and an accelerator circuit coupled to the hardware processor core, the accelerator circuit to: in response to a descriptor, comprising an indication of a hash key and encrypted data to be decrypted, from the hardware processor core, perform a determination that the encrypted data is to be read in an encrypted order or a reverse order from the encrypted order, in response to the determination that the encrypted data is to be read in the reverse order, generate a resultant authentication tag in the reverse order for the encrypted data based at least in part on the hash key without reordering the encrypted data in the reverse order into the encrypted order, and, in response to the determination that the encrypted data is to be read in the encrypted order, generate the resultant authentication tag in the encrypted order for the encrypted data based at least in part on the hash key.

24 Claims, 22 Drawing Sheets

500 ⤵

```
┌─────────────────────────────────────────────────────────────────────────┐
│ SENDING, BY A HARDWARE PROCESSOR CORE OF A SYSTEM, A DESCRIPTOR         │
│ COMPRISING AN INDICATION OF A HASH KEY AND ENCRYPTED DATA TO BE         │
│ DECRYPTED TO AN ACCELERATOR CIRCUIT OF THE SYSTEM COUPLED TO            │
│ THE HARDWARE PROCESSOR CORE                                             │
│                                   502                                    │
└─────────────────────────────────────────────────────────────────────────┘
                                    │
                                    ▼
┌─────────────────────────────────────────────────────────────────────────┐
│ IN RESPONSE TO RECEIVING THE DESCRIPTOR, DETERMINING IF THE ENCRYPTED   │
│ DATA IS TO BE READ IN AN ENCRYPTED ORDER OR A REVERSE ORDER FROM THE    │
│ ENCRYPTED ORDER BY THE ACCELERATOR CIRCUIT                              │
│                                   504                                    │
└─────────────────────────────────────────────────────────────────────────┘
                                    │
                                    ▼
┌─────────────────────────────────────────────────────────────────────────┐
│ IN RESPONSE TO THE DETERMINING THAT THE ENCRYPTED DATA IS TO BE READ    │
│ IN THE REVERSE ORDER, GENERATING A RESULTANT AUTHENTICATION TAG IN      │
│ THE REVERSE ORDER FOR THE ENCRYPTED DATA BASED AT LEAST IN PART ON      │
│ THE HASH KEY BY THE ACCELERATOR CIRCUIT WITHOUT REORDERING THE          │
│ ENCRYPTED DATA IN THE REVERSE ORDER INTO THE ENCRYPTED ORDER            │
│                                   506                                    │
└─────────────────────────────────────────────────────────────────────────┘
                                    │
                                    ▼
┌─────────────────────────────────────────────────────────────────────────┐
│ IN RESPONSE TO THE DETERMINING THAT THE ENCRYPTED DATA IS TO BE READ    │
│ IN THE ENCRYPTED ORDER, GENERATING THE RESULTANT AUTHENTICATION TAG     │
│ IN THE ENCRYPTED ORDER FOR THE ENCRYPTED DATA BASED AT LEAST IN PART    │
│ ON THE HASH KEY BY THE ACCELERATOR CIRCUIT                              │
│                                   508                                    │
└─────────────────────────────────────────────────────────────────────────┘
                                    │
                                    ▼
┌─────────────────────────────────────────────────────────────────────────┐
│           WRITING THE RESULTANT AUTHENTICATION TAG TO STORAGE            │
│                                   510                                    │
└─────────────────────────────────────────────────────────────────────────┘
```

FIG. 5

| DESCRIPTOR 1000 | | | | | | | |
|---|---|---|---|---|---|---|---|
| Byte 7 | Byte 6 | Byte 5 | Byte 4 | Byte 3 | Byte 2 | Byte 1 | Byte 0 | bytes |
| Operation | | Flags | | P+ | Ignored | PASID | | 0 |
| Completion Record Address | | | | | | | | 8 |
| Source Address | | | | | | | | 16 |
| Destination Address | | | | | | | | 24 |
| Transfer Size | | | | | | | | 32 |
| Completion Interrupt Handle | | | | | | | | 40 |
| Operation-specific fields | | | | | | | | 48 |
| | | | | | | | | 56 |

OPERATION CODE 1002

FIG. 10

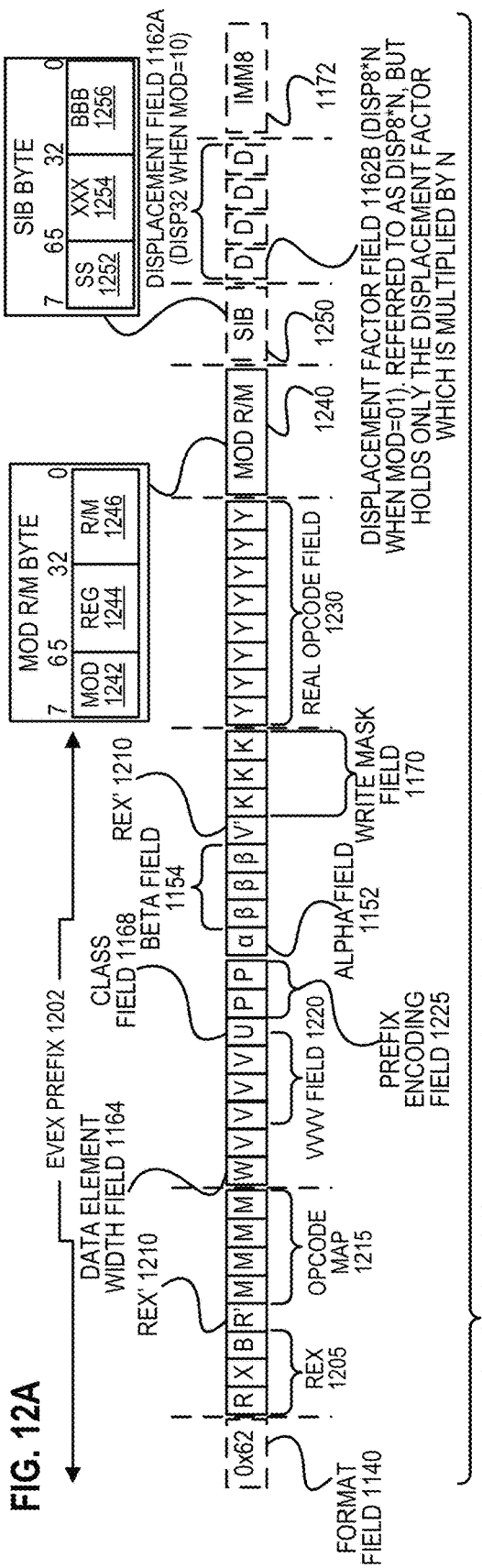
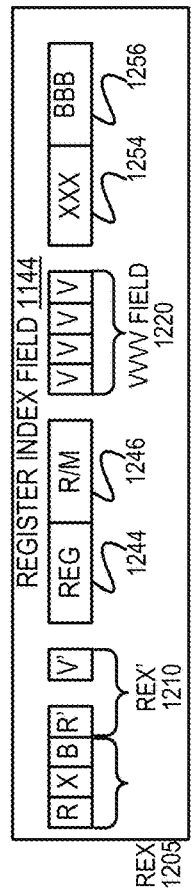
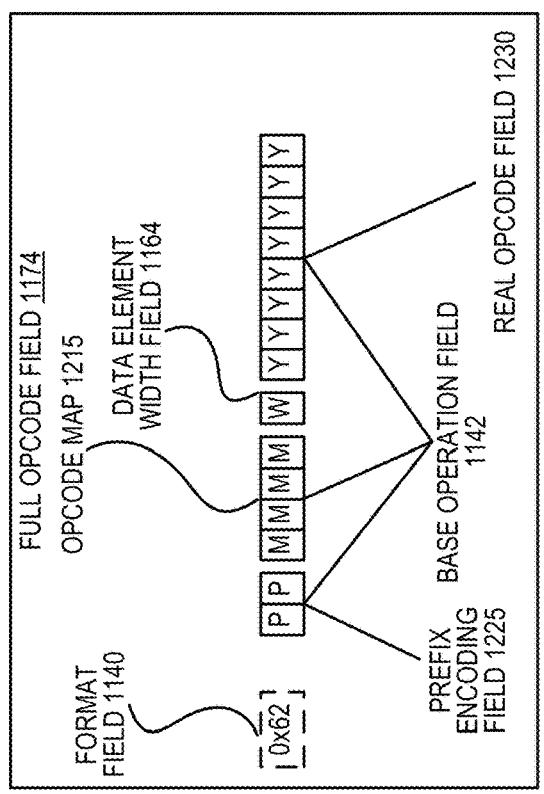
FIG. 12A
FIG. 12B
FIG. 12C

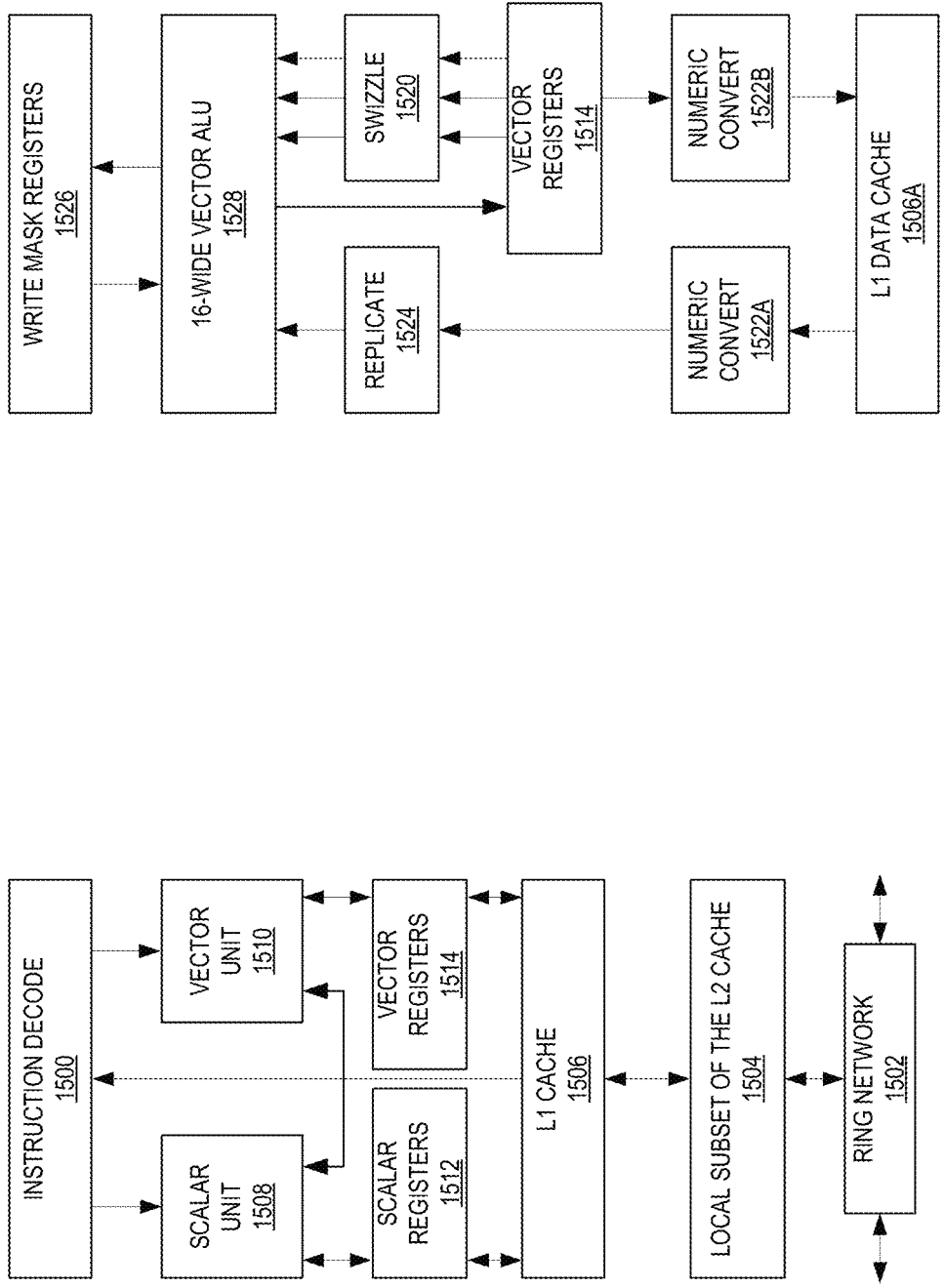

CIRCUITRY AND METHODS FOR LOW-LATENCY EFFICIENT CHAINED DECRYPTION AND DECOMPRESSION ACCELERATION

TECHNICAL FIELD

The disclosure relates generally to electronics, and, more specifically, an embodiment of the disclosure relates to circuitry for low-latency page efficient chained decryption and decompression acceleration.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 5 is a flow diagram illustrating operations of a method of decryption according to embodiments of the disclosure.

FIG. 10 illustrates an example format of a descriptor according to embodiments of the disclosure.

FIG. 12A is a block diagram illustrating fields for the generic vector friendly instruction formats in FIGS. 11A and 11B according to embodiments of the disclosure.

FIG. 12B is a block diagram illustrating the fields of the specific vector friendly instruction format in FIG. 12A that make up a full opcode field according to one embodiment of the disclosure.

FIG. 12C is a block diagram illustrating the fields of the specific vector friendly instruction format in FIG. 12A that make up a register index field according to one embodiment of the disclosure.

FIG. 15A is a block diagram of a single processor core, along with its connection to the on-die interconnect network and with its local subset of the Level 2 (L2) cache, according to embodiments of the disclosure.

FIG. 15B is an expanded view of part of the processor core in FIG. 15A according to embodiments of the disclosure.

DETAILED DESCRIPTION

Figure 1:
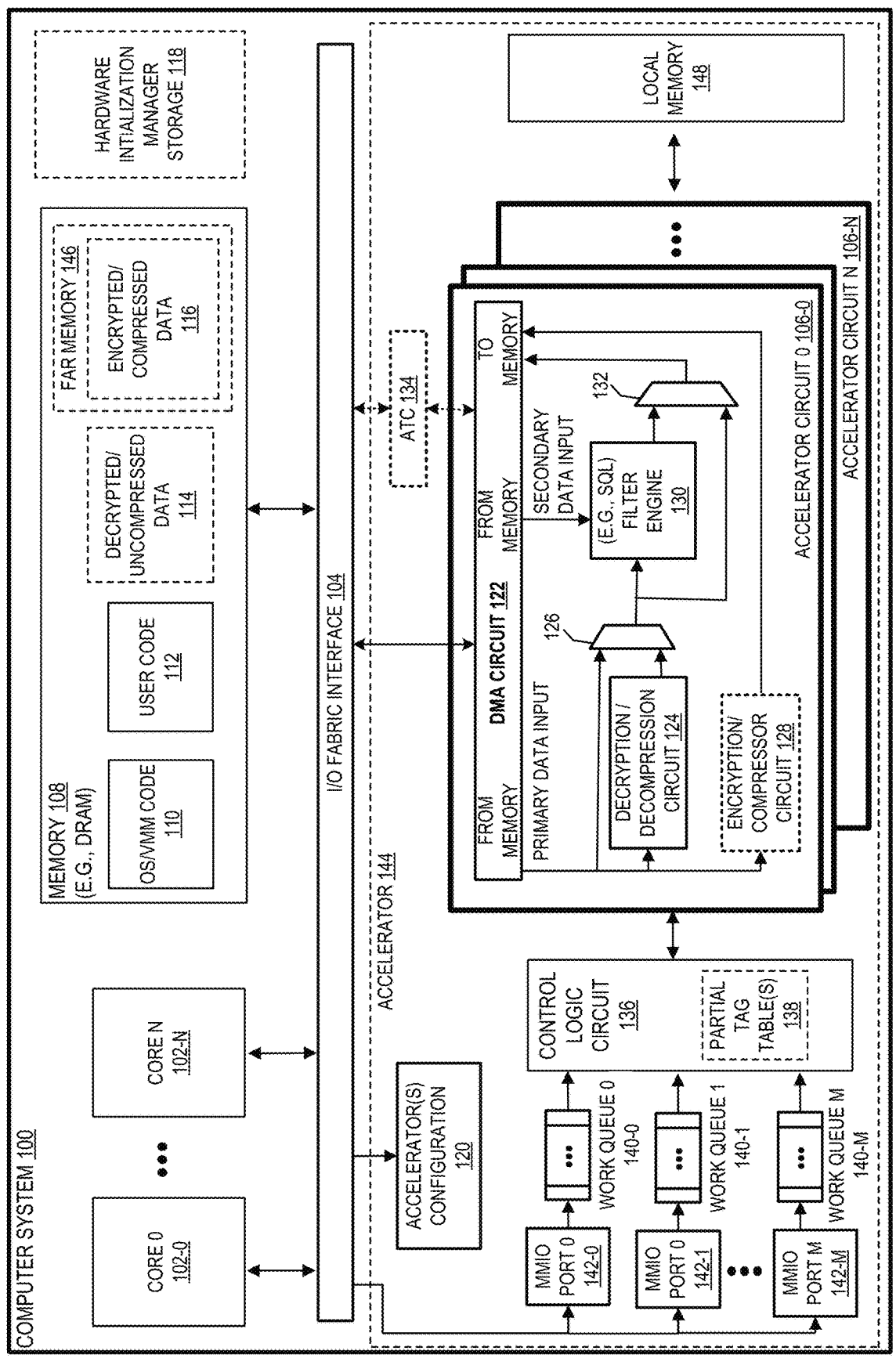
FIG. 1 illustrates a block diagram of a computer system including a plurality of cores, a memory, and an accelerator circuit including a decryption and/or decompression circuit according to embodiments of the disclosure.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. A system may include a plurality of cores, e.g., with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM) (e.g., an Intel® Optane™ memory), for example, accessible according to a Peripheral Component Interconnect Express (PCIe) standard.

Certain embodiments utilize a "far memory" in a memory hierarchy, e.g., to store infrequently accessed (e.g., "cold") data into the far memory. Doing so allows certain system to perform a same operation(s) with a lower volatile memory (e.g., DRAM) capacity. Persistent memory may be used as a second tier of memory (e.g., "far memory"), e.g., with volatile memory (e.g., DRAM) being a first tier of memory (e.g., "near memory").

In one embodiment, a processor is coupled to a (e.g., on die or off die) hardware accelerator (e.g., an offload engine) to perform one or more (e.g., offloaded) operations, for example, instead of those operations being performed only by the processor. In one embodiment, a processor includes an (e.g., on die or off die) accelerator (e.g., an offload engine) to perform one or more operations, for example, instead of those operations being performed only on the processor. There are generally two types of hardware accelerators, (1) offload/look-aside accelerators and (2) inline accelerators. In one embodiment, an offload accelerator is when a processor (e.g., central processing unit (CPU)) sends work to a hardware accelerator device, e.g., by creating a description of the work (e.g., job) to be completed (e.g., which may be referred to as a descriptor) and submitting the descriptor to the hardware accelerator. In one embodiment, inline accelerators are those that are invoked directly in the path of the data flow without host (e.g., CPU), for example, a network interface controller (NIC), e.g., such that a server (e.g., CPU) offloads certain functions to the NIC (e.g., network management and/or security functions).

Two non-limiting examples of operations are a compression operation and a decompression operation. A compression operation may refer to encoding information using fewer bits than the original representation. A decompression operation may refer to decoding the compressed information back into the original representation. A compression operation may compress data from a first format to a compressed, second format. A decompression operation may decompress data from a compressed, first format to an uncompressed, second format. A compression operation may be performed according to an (e.g., compression) algorithm. A decompression operation may be performed according to an (e.g., decompression) algorithm. Additionally or alternatively, two other non-limiting examples of operations are an encryption operation and a decryption operation. An encryption operation may refer to converting (e.g., scrambling) data (e.g., the original representation of the information (e.g., "plaintext")) into an alternative form (e.g., "ciphertext")) so only the authorized recipient can read it (e.g., where a key is used to interpret the data). A decryption operation may refer to converting (e.g., descrambling) the alternative form of the data (e.g., "ciphertext")) into the original representation of the information (e.g., "plaintext"), e.g., via a key. The "original" data may be compressed data or uncompressed data.

In one embodiment, an accelerator performs a compression operation and/or decompression operation in response to a request to and/or for a processor (e.g., a central processing unit (CPU)) to perform that operation. An accelerator may be a hardware compression accelerator or a hardware decompression accelerator. An accelerator may couple to memory (e.g., on die with an accelerator or off die) to store data, e.g., the input data and/or the output data. An accelerator may utilize one or more buffers (e.g., on die with an accelerator or off die) to store data, e.g., the input data and/or the output data. In one embodiment, an accelerator couples to an input buffer to load input therefrom. In one embodiment, an accelerator couples to an output buffer to store output thereon. A processor may execute an instruction to offload an operation or operations (e.g., for an instruction, a thread of instructions, or other work) to an accelerator.

An operation may be performed on a data stream (e.g., stream of input data). A data stream may be an encoded, compressed data stream. In one embodiment, data is first compressed, e.g., according to a compression algorithm, such as, but not limited to, the zstandard algorithm, the LZ77 lossless data compression algorithm, or the LZ78 lossless data compression algorithm. In one embodiment, a compressed symbol that is output from a compression algorithm is encoded into a code, for example, encoded according to the Huffman algorithm (Huffman encoding), e.g., such that more common symbols are represented by code that uses fewer bits than less common symbols. In certain embodiments, a code that represents (e.g., maps to) a symbol includes fewer bit in the code than in the symbol. In certain embodiments of encoding, each fixed-length input symbol is represented by (e.g., maps to) a corresponding variable-length (e.g., prefix free) output code (e.g., code value).

The DEFLATE data compression algorithm may be utilized to compress and decompress a data stream (e.g., data set). In certain embodiments of a DEFLATE compression, a data stream (e.g., data set) is divided into a sequence of data blocks and each data block is compressed separately. An end-of-block (EOB) symbol may be used to denote the end of each block. In certain embodiments of a DEFLATE compression, the LZ77 algorithm contributes to DEFLATE compression by allowing repeated character patterns to be represented with (length, distance) symbol pairs where a length symbol represents the length of a repeating character pattern and a distance symbol represents its distance, e.g., in bytes, to an earlier occurrence of the pattern. In certain embodiments of a DEFLATE compression, if a character pattern is not represented as a repetition of its earlier occurrence, it is represented by a sequence of literal symbols, e.g., corresponding to 8-bit byte patterns.

In certain embodiments, Huffman encoding is used in DEFLATE compression for encoding the length, distance, and literal symbols, e.g., and end-of-block symbols. In one embodiment, the literal symbols (e.g., values from 0 to 255), for example, used for representing all 8-bit byte patterns, together with the end-of-block symbol (e.g., the value 256) and the length symbols (e.g., values 257 to 285), are encoded as literal/length codes using a first Huffman code tree. In one embodiment, the distance symbols (e.g., represented by the values from 0 to 29) are encoded as distance codes using a separate, second Huffman code tree. Code trees may be stored in a header of the data stream. In one embodiment, every length symbol has two associated values, a base length value and an additional value denoting the number of extra bits to be read from the input bit-stream. The extra bits may be read as an integer which may be added to the base length value to give the absolute length represented by the length symbol occurrence. In one embodiment, every distance symbol has two associated values, a base distance value and an additional value denoting the number of extra bits to be read from the input bit-stream. The base distance value may be added to the integer made up of the associated number of extra bits from the input bit-stream to give the absolute distance represented by the distance symbol occurrence. In one embodiment, a compressed block of DEFLATE data is a hybrid of encoded literals and LZ77 look-back indicators terminated by an end-of-block indicator. In one embodiment, DEFLATE may be used to compress a data stream and INFLATE may be used to decompress the data stream. INFLATE may generally refer to the decoding process that takes a DEFLATE data stream for decompression (and decoding) and correctly produces the original full-sized data or file. In one embodiment, a data stream is an encoded, compressed DEFLATE data stream, for example, including a plurality of literal codes (e.g., codewords), length codes (e.g., codewords), and distance codes (e.g., codewords).

In certain embodiments, when a processor (e.g., CPU) sends work to a hardware accelerator (e.g., device), the processor (e.g., CPU) creates a description of the work to be completed (e.g., a descriptor) and submits the descriptor to the hardware accelerator. In certain embodiments, the descriptor is sent by a (e.g., special) instructions (e.g., job enqueue instructions) or via memory mapped input/output (MMIO) write transactions, for example, where an input/output MMIO (IOMMU) maps device (e.g., accelerator) visible virtual addresses (e.g., device addresses or I/O addresses) to corresponding physical addresses in memory.

A critical usage for accelerators is decompression, especially when combined with decryption. In certain embodiments (e.g., for best latency), accelerators are to process decryption and decompression in a chained manner, e.g., where the output from decryption is fed into the decompress stage, with both circuits operating simultaneously as part of a single combined "job" (e.g., corresponding to a single descriptor).

In certain embodiments, data is compressed (e.g., according to a compression/decompression standard), and the compressed data is then encrypted (e.g., according to an encryption/decryption standard) into encrypted data. In certain embodiments, the encrypted data is transmitted (e.g., via the internet) to another device (e.g., including an accelerator according to this disclosure) and is then decrypted (e.g., according to that encryption/decryption standard) into decrypted data, and the decrypted data is decompressed (e.g., according to that compression/decompression standard). However, certain standards are to read the encrypted (e.g., and compresses) data in a reverse (e.g., backward) order from the order it was encrypted. For example, the encrypted data may be multiple blocks that are indexed from 0 to N−1 in encrypted order (e.g., also being compression order), but may be decrypted (e.g., and read) in reverse order of N−1 to 0. For example, a zstandard algorithm may include certain sections (e.g., literal stream section and/or sequence section) that are processed in reverse (e.g., backward) order relative to the encrypted order. Instead of waiting for the entire set of that encrypted data (e.g., blocks 0 to N−1) to arrive (e.g., and be buffered), embodiments herein perform a decryption of the encrypted data in the reverse order, for example, without reordering the encrypted data that is in the reverse order to be in the encrypted order (e.g., without waiting for the entire set of that encrypted data to arrive to start decryption). In one embodiment, a zstandard defines blocks of data that hold the compressed bit-stream as a set of sections such as the literal bytes and the match sequences, e.g., and the sequences are compressed (e.g., encoded) with an entropy code known as finite state entropy (FSE). Examples of zstandard format data is discussed further below.

In one embodiment, a (e.g., zstandard) stream comprises blocks, with different sections of blocks that are to be read in either forward or reverse direction. Due to this quirk of certain standards, a decryption/decompression accelerator may incur a large cost due to local memory (e.g., static random-access memory (SRAM)), for example, a certain sized (e.g., 128 KB) memory at the input of the accelerator (e.g., in addition to a (e.g., 256 KB) history buffer). However, it may be desirable to only have a history buffer (e.g., a 32 KB memory for history) and no other (e.g., large) local memories. For example, certain embodiments herein instantiate an appropriately sized history buffer memory for (e.g., zstandard) usages, but without the input (e.g., 128 KB) buffer memory, thus avoiding a large cost in terms of (e.g., silicon) area and latency. In certain embodiments, the latency effect is due to the mode of operation where input data is read into the buffer (e.g., up to 128 KB), and actual decoding of the block starts only when the block of input has been written into this local memory.

An issue is that in certain embodiments, encryption is done at a higher layer than compression, e.g., when encrypt a file, the encryption is agnostic to the contents (e.g., the data could be raw or compressed with any format). Thus, encryption is (e.g., always) done in one direction from the start of the data (e.g., buffer) to the end in certain embodiments, and if the underlying payload has some sections that need to be read in reverse, then it cannot be done unless the decryption can be done in either direction depending on what that section needs.

Embodiments herein reduce the overhead and latency of (e.g., zstandard) decompression by designing an accelerator to read multiple sections of a compression block in the forward or reverse direction, and stream that data through a novel decryption operations circuit that can successfully decrypt the block in a forward and a reverse (e.g., random) order (e.g., with respect to the sections and the direction of access). Embodiments herein are directed to an accelerator that (i) has the ability to read an input stream as a set of sections, where each section can be read in any order relative to other sections, and can be read in the forward or backward direction, and/or (ii) has the ability to chain decryption and decompression (e.g., along with (i) above).

Embodiments herein reduce the latency when submitting chained decryption (e.g., zstandard) and decompression jobs to an accelerator. In certain embodiments, none of the circuits of the accelerator are required to have large memories to buffer input data or intermediate decrypted data, thus saving on the area cost.

In addition to hardware circuits, embodiments here describe an interface for work (e.g., job) submission and a software flow used to process the decrypt-decompress operation efficiently. For example, allowing use of such hardware by a software application programming interface (API), e.g., kernel drivers and/or user-mode code library.

Certain embodiments that chain decryption and decompression are discussed below in reference to encryption and decryption according to an Advanced Encryption Standard Galois/Counter Mode (AES-GCM). It should be understood that this is an illustrative example and embodiments herein are applicable to other encryption and decryption standards/algorithms.

Turning now to FIG. 1, an example system architecture is depicted. FIG. 1 illustrates a block diagram of a computer system 100 including a plurality of cores 102-0 to 102-N (e.g., where N is any positive integer greater than one, although single core embodiments may also be utilized), a memory 108, and an accelerator circuit 106-0 (e.g., accelerator engine) including a decryption and/or decompression circuit 124 according to embodiments of the disclosure. In certain embodiments, an accelerator 144 includes a plurality of accelerator circuits 106-0 to 106-N (e.g., where N is any positive integer greater than one, although single accelerator circuit embodiments may also be utilized).

Memory 102 may include operating system (OS) and/or virtual machine monitor code 110, user (e.g., program) code 112, uncompressed data (e.g., pages) 114, compressed data (e.g., pages) 116 or any combination thereof. In certain embodiments of computing, a virtual machine (VM) is an emulation of a computer system. In certain embodiments, VMs are based on a specific computer architecture and provide the functionality of an underlying physical computer system. Their implementations may involve specialized hardware, firmware, software, or a combination. In certain embodiments, the virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain embodiments. When installed over a host machine (e.g., processor) in certain embodiments, a VMM facilitates the creation of VMs, e.g., each with separate operating systems (OS) and applications. The VMM may manage the backend operation of these VMs by allocating the necessary computing, memory, storage, and other input/output (I/O) resources, such as, but not limited to, an input/output memory management unit (IOMMU). The VMM may provide a centralized interface for managing the entire operation, status, and availability of VMs that are installed over a single host machine or spread across different and interconnected hosts.

Memory 108 may be memory separate from a core and/or accelerator. Memory 108 may be DRAM. Encrypted and compressed data 116 may be stored in a first memory device (e.g., far memory 146) and/or decrypted and uncompressed data 114 may be stored in a separate, second memory device (e.g., as near memory). In certain embodiments, encrypted (e.g., and compressed) data is loaded (e.g., streamed) from external to the computer system, e.g., via network coupled to computer system 100.

A coupling (e.g., input/output (I/O) fabric interface 104) may be included to allow communication between accelerator 144, core(s) 102-0 to 102-N, and memory 108.

In one embodiment, the hardware initialization manager (non-transitory) storage 118 stores hardware initialization manager firmware (e.g., or software). In one embodiment, the hardware initialization manager (non-transitory) storage 118 stores Basic Input/Output System (BIOS) firmware. In another embodiment, the hardware initialization manager (non-transitory) storage 118 stores Unified Extensible Firmware Interface (UEFI) firmware. In certain embodiments (e.g., triggered by the power-on or reboot of a processor), computer system 100 (e.g., core 102-0) executes the hardware initialization manager firmware (e.g., or software) stored in hardware initialization manager (non-transitory) storage 118 to initialize the system 100 for operation, for example, to begin executing an operating system (OS) and/or initialize and test the (e.g., hardware) components of system 100.

An accelerator 144 may include any of the depicted components. For example, with one or more instance of an accelerator circuit 106-0 to 106-N. In certain embodiments, a job (e.g., corresponding descriptor for that job) is submitted to the accelerator 144 via the work queues 140-0 to 140-M, e.g., where M is any positive integer greater than one, although work queue embodiments may also be utilized). In one embodiment, the number of work queues is the same as the number of accelerator circuits (e.g., engines). In certain embodiments, an accelerator configuration 120 (e.g., configuration value stored therein) causes accelerator 144 to be configured to perform one or more (e.g., decryption, decompression, encryption, or compression) operations. In certain embodiments, control logic circuit 136 (e.g., in response to accelerator configuration 120) selects a job from a work queue and submits it to an accelerator circuit 106-0 to 106-N for one or more operations.

In the depicted embodiment, a (e.g., each) accelerator circuit 106-0 to 106-N includes a decryption/decompressor circuit 124 to perform decryption (e.g., according to an encryption key) and decompression operations (see, e.g., FIG. 3), a compressor circuit 128 to perform compression operations (e.g., and encryption operations), and a direct memory access (DMA) circuit 122, e.g., to connect to memory 108, internal memory (e.g., cache) of a core, and/or far memory 146. In one embodiment, compressor circuit 128 is (e.g., dynamically) shared by two or more of the accelerator circuits 106-0 to 106-N. In certain embodiments, the data for a job that is assigned to a particular accelerator circuit (e.g., accelerator circuit 106-0) is streamed in by DMA circuit 122, for example, as primary and/or secondary input. Multiplexers 126 and 132 may be utilized to route data for a particular operation. Optionally, a (e.g., Structured Query Language (SQL)) filter engine 130 may be included, for example, to perform a filtering query (e.g., for a search term input on the secondary data input) on input data, e.g., on decompressed data output from decompressor circuit 124.

In certain embodiments, partial tag table(s) 138 are included to store certain date for partial tag(s), e.g., one entry for each section of a job. In certain embodiments, each work queue 140-0 to 140-M includes an MMIO port 142-0 to 142-N, respectively. In certain embodiments, a core sends a job (e.g., a descriptor) to accelerator 144 via one or more of the MMIO ports 142-0 to 142-N. Optionally, an address translation cache (ATC) 134 may be included, e.g., as a TLB to translate a virtual (e.g., source or destination) address to a physical address (e.g., in memory 108 and/or far memory 146). As discussed below, accelerator 144 may include a local memory 148 (e.g., history buffer), e.g., shared by a plurality of accelerator circuits 106-0 to 106-N. Computer system 100 may couple to a hard drive, e.g., storage unit 1828 in FIG. 18.

Figure 2:
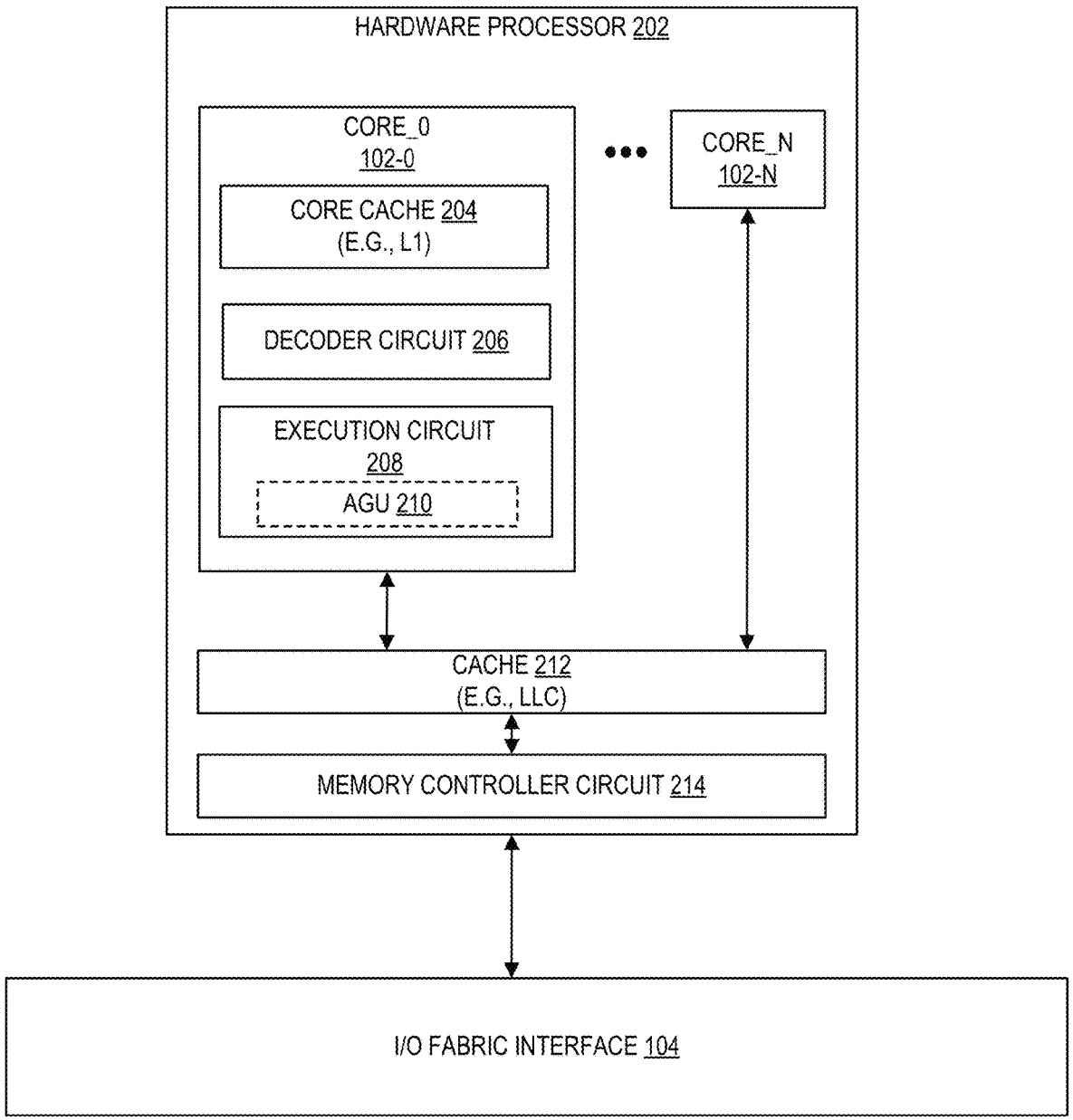
FIG. 2 illustrates a block diagram of a hardware processor including a plurality of cores according to embodiments of the disclosure.

FIG. 2 illustrates a block diagram of a hardware processor 202 including a plurality of cores 102-0 to 102-N according to embodiments of the disclosure. Memory access (e.g., store or load) request may be generated by a core, e.g., a memory access request may be generated by execution circuit 208 of core 102-0 (e.g., caused by the execution of an instruction) and/or a memory access request may be generated by execution circuit of core 102-N (e.g., by address generation unit 210 thereof) (e.g., caused by a decode by decoder circuit 206 of an instruction and the execution of the decoded instruction). In certain embodiments, a memory access request is serviced by one or more levels of cache, e.g., core (e.g., first level (L1)) cache 204 for core 102-0 and a cache 212 (e.g., last level cache (LLC)), e.g., shared by a plurality of cores. Additionally or alternatively (e.g., for a cache miss), memory access request may be serviced by memory separate from a cache, e.g., but not a disk drive.

In certain embodiments, hardware processor 202 includes a memory controller circuit 214. In one embodiment, a single memory controller circuit is utilized for a plurality of cores 102-0 to 102-N of hardware processor 202. Memory controller circuit 214 may receive an address for a memory access request, e.g., and for a store request also receiving the payload data to be stored at the address, and then perform the corresponding access into memory, e.g., via I/O fabric interface 104 (e.g., one or more memory buses). In certain embodiments, memory controller circuit 214 includes a memory controller for volatile type of memory 108 (e.g., DRAM) and a memory controller for non-volatile type of far memory 146 (e.g., non-volatile DIMM or non-volatile DRAM). Computer system 100 may also include a coupling to secondary (e.g., external) memory (e.g., not directly accessible by a processor), for example, a disk (or solid state) drive (e.g., storage unit 1828 in FIG. 18).

As noted above, an attempt to access a memory location may indicate that the data to be accessed is not available, e.g., a page miss. Certain embodiments herein then trigger a decompressor circuit to perform a decryption/decompression operation (e.g., via a corresponding descriptor) on the compressed version of that data, e.g., to service the miss with the decompressed data within a single computer or from external to the single computer.

Figure 3:
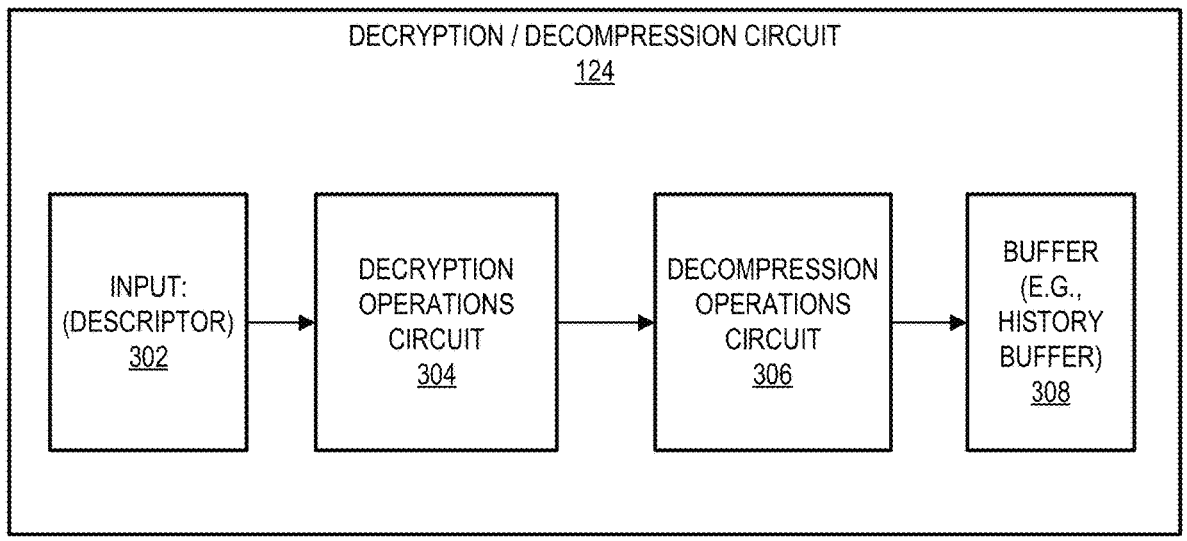
FIG. 3 is a block diagram of a decryption/decompression circuit according to embodiments of the disclosure.

FIG. 3 is a block flow diagram of a decryption/decompressor circuit 124 according to embodiments of the disclosure. Decryption/decompressor circuit 124 takes as an input a descriptor 302, performs a decryption via decryption operations circuit 304 on the encrypted and compressed data identified in the descriptor 302, perform a decompression via decompression operations circuit 306, and then stores that resultant data within buffer 308 (e.g., history buffer). In certain embodiments, the buffer 308 is sized to store all the data from a single decompression operation. In certain embodiments, the decryption operations circuit 304 and/or decompression operations circuit 306 operate according to the disclosure herein.

Turning to FIGS. 1 and 3 cumulatively, as one example use, a (e.g., decryption and decompression) operation is desired, and a corresponding descriptor is sent to accelerator 144, e.g., into a work queue 140-0 to 140-M. In certain embodiments, that descriptor is then picked up by control logic circuit 136 and sent to one of the accelerator circuits 106-0 to 106-N (e.g., engines), for example, which are mapped to different compression and decompression pipelines. In certain embodiments, the engine will start reading the source data from the source address (e.g., in encrypted and compressed data 116) specified in the descriptor, and the DMA circuit 122 will send a stream of input data into the decompressor circuit 124.

Example Software flow

In certain embodiments, software (e.g., a kernel driver or user-mode library on top of the kernel driver) will perform the following steps to submit a combined decryption and decompression (decrypt-decompress) job to an accelerator:
(1) Decrypt headers (e.g., frame/block) to extract sizes of various blocks and sections within.
(2) For each block:
  a. Calculate offsets of different sections (e.g., Huffman code table, FSE table, compressed literal section, compressed sequence sections, etc.).
  b. Create a descriptor with opcode, start address/pointer of block, (e.g., byte) position of the start of block relative to start of the file, and N pairs of <offset, forward (Fwd)/reverse(Rev) flag>per section within block.
  c. Optionally touch the input data and load into cache hierarchy
  d. Submit job to accelerator, e.g., via enqueue (ENQ) instruction or move-as-direct store (movdir) instruction.

It should be understood that other variations are possible such as extending to multiple number of blocks per job, etc. The flag field could also be implicit, e.g., derived from the knowledge of the different sections. In certain embodiments, the descriptor will have other fields, but those are omitted in the discussion here since fields like destination address or completion addresses or interrupts are not necessarily relevant to the embodiments here, e.g., it will be assumed that those fields are present and operate correctly.

In certain embodiments, software performs minimal amount of decryption, e.g., just the header and meta-data in the (e.g., zstandard) compressed stream. In certain embodiments, an accelerator is responsible for the whole decryption and ensuring the message authentication code (MAC) (e.g., tag) integrity is verified.

Accelerator Flow

In certain embodiments, when an accelerator works on a job, it will create multiple read streams using the N offsets and the base block address B provided in the descriptor, e.g., where each direct memory address (DMA) request to memory will be of the form "read from address B+offset, Si bytes above/below". In certain embodiments, the size of each section can be derived from all the offset information provided (e.g., using any consecutive pair of offsets).

In certain embodiments, these read streams will be sent to the accelerator (e.g., their operation circuits) in some specific order that is required for decompress. One example order would be:
Read the literal Huffman code table section (forward direction, e.g., such that the starting address is provided)
Read the literal stream section (backward direction, e.g., such that the ending address is provided)
Read the FSE table section (forward direction, e.g., such that the starting address is provided)
Read the sequence section (backward direction, e.g., such that the ending address is provided)

E.g., together forming a single compression block (e.g., with each section comprising multiple cipher blocks).

In certain embodiments, some processing is to be done before others, e.g., parsing the Huffman tables and setting up the decoders (e.g., in the decompression circuit) before decoding the literal stream. Likewise, for an FSE table and a sequence decode. However, if the accelerator can work on a plurality of streams, then after the tables have been parsed and decode tables setup, certain embodiments can read some amount of literal stream data and some amount of sequence data together, e.g., rather than wait to read the entire literal stream. Other variations are possible depending on the exact microarchitecture of the accelerator.

Note: for simplicity, the above indicates the sequence section as one section, but in certain embodiments it is a plurality of section, e.g., in a zstandard this may comprise 3 sub-sections. In certain embodiments, data that is to be decrypted (e.g., and then decompressed) includes N sections where some section(s) are to be read (e.g., and decrypted) in the forward direction, and some section(s) are to be read (e.g., and decrypted) in the reverse direction. In certain embodiments, if the operation has decryption combined with (e.g., zstandard) decompression, then the decryption/decompression circuit (e.g., execution pipelines within decryption operations circuit) are to be able to decrypt the data in the scrambled order (e.g., as needed by zstandard).

In certain embodiments, an AES-GCM operation consists of an AES encryption in counter-mode, and a GHASH for the MAC (integrity) generation/verification.

Figure 4:
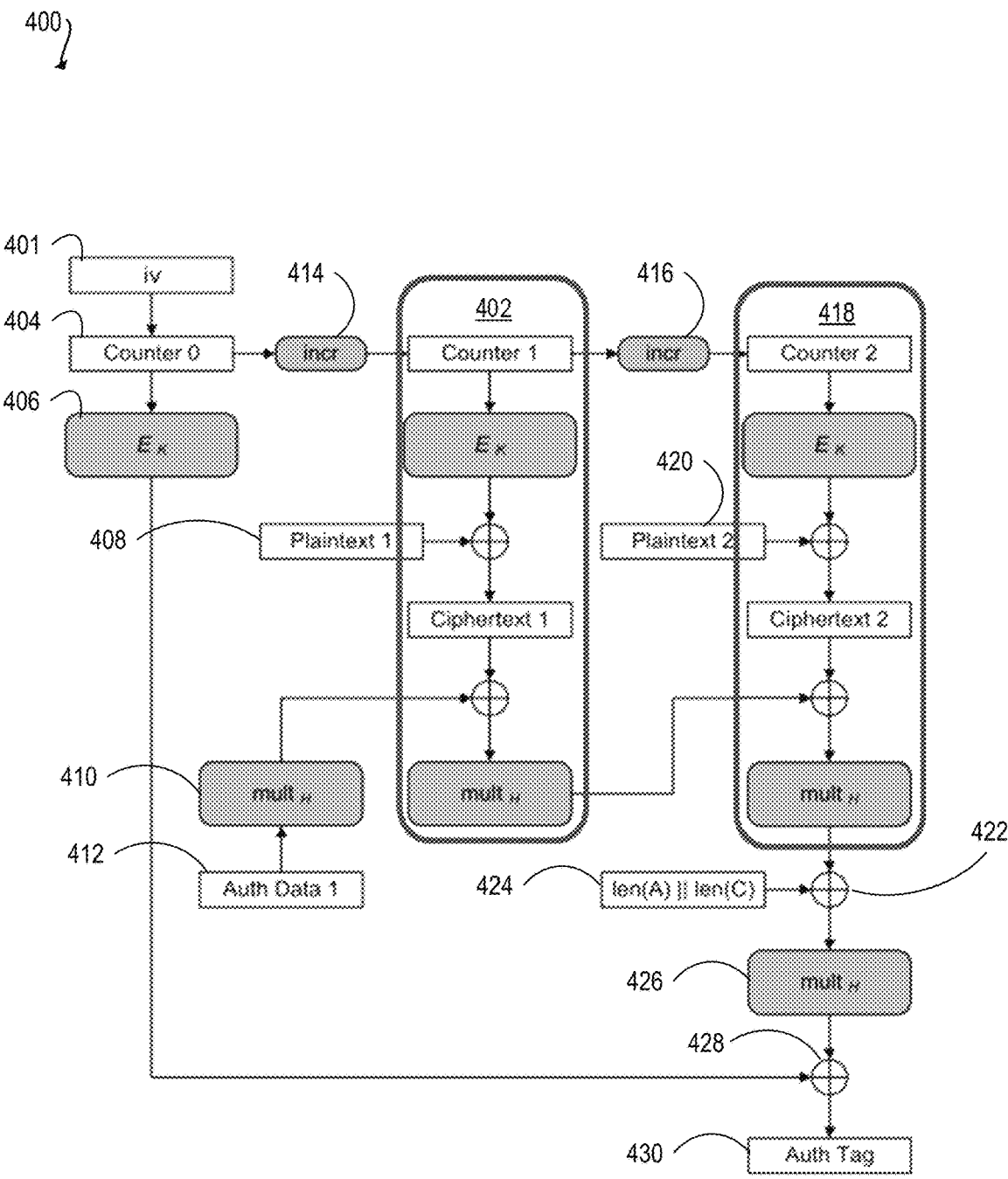
FIG. 4 is a block flow diagram of operations for a symmetric-key cryptographic block cipher according to embodiments of the disclosure.

FIG. 4 is a block flow diagram of operations 400 for a symmetric-key cryptographic block cipher (e.g., AES-GCM) according to embodiments of the disclosure. As one example, GCM combines a counter mode of encryption with a Galois mode of authentication, e.g., where the key-feature is the ease of parallel-computation of the Galois field multiplication used for authentication. This feature permits higher throughput than encryption algorithms which use chaining modes. In one embodiment, the $GF(2^{128})$ field used is defined by the polynomial:

$$x^{128}+x^7+x^2+x+1$$

and the authentication tag 430 is constructed by feeding blocks of data into the GHASH function and encrypting the result.

An example GHASH function is:

$$GHASH(H,A,C)=X_{m+n+1}$$

where $H=E_k(0^{128})$ is the Hash Key (e.g., a string of 128 zero bits encrypted using the block cipher), A is data which is only authenticated (e.g., not encrypted), C is the ciphertext, m is the number of 128-bit blocks in A (e.g., rounded up), n is the number of 128-bit blocks in C (e.g., rounded up), and the variable $X_i$ for i=0, . . . , m+n+1 is discussed below.

First, the authenticated text and the cipher text are separately zero-padded to multiples of 128 bits and combined into a single message $S_i$:

$$S_i = \begin{cases} A_i & \text{for } i = 1, \ldots, m-1 \\ A_m^* \| 0^{128-v} & \text{for } i = m \\ C_{i-m} & \text{for } i = m+1, \ldots, m+n-1 \\ C_n^* \| 0^{128-u} & \text{for } i = m+n \\ \text{len}(A) \| \text{len}(C) & \text{for } i = m+n+1 \end{cases}$$

where len(A) and len(C) are the 64-bit representations of the bit lengths of A and C, respectively, v=len(A) mod 128 is the bit length of the final block of A, u=len(C) mod 128 is the bit length of the final block of C, and ∥ denotes concatenation of bit strings.

Then $X_i$ is:

$$X_i = \sum_{j=1}^{i} S_j \cdot H^{i-j+1} = \begin{cases} 0 & \text{for } i=0 \\ (X_{i-1} \oplus S_i) \cdot H & \text{for } i=1, \ldots, m+n+1 \end{cases}$$

where ⊗ is the bitwise exclusive OR (XOR) (where for a pair of corresponding bits, the output is true when either of two input bits are true but not both).

The second form is an efficient iterative algorithm (each $X_i$ depends on $X_{i-1}$) produced by applying Homer's method to the first, e.g., only the final $X_{m+n+1}$ remains an output.

If it is necessary to parallelize the hash computation, this can be done by interleaving k times:

$$X_i' = \begin{cases} 0 & \text{for } i \leq 0 \\ (X_{i-k}' \oplus S_i) \cdot H^k & \text{for } i=1, \ldots, m+n+1-k \end{cases}$$

$$X_i = \sum_{j=1}^{k} (X_{i+j-2k}' \oplus S_{i+j-k}) \cdot H^{k-j+1}$$

Turning to FIG. 4, an initial value 401 is input as counter 404, that value is sent to encryption block $E_k$ 406 for encrypting, and the encrypted value is sent to one input of XOR logic circuit 428. Plaintext 408 is input into circuitry 402 along with incremented value from incrementing (and/or decrementing) circuit 414 and output of multiplier 410 on authentication data 412 to generate corresponding outputs that are sent to circuitry 418 and incrementing (and/or decrementing) circuit 416 with plaintext 420, and that output is sent to XOR circuit 422 along with the concatenated output 424. That output is sent to multiplier 426, and the resulting output is sent to XOR circuit 428 along with output from encryption block $E_k$ 406 to generate the authentication tag 430.

In certain embodiments, the main blocks are $E_k$ for encrypting counters, and the $mult_H$ block that computes the GHASH. FIG. 4 is for a minimal sized data buffer, but for a larger file, the circuitry 402 corresponding to counter1 is replicated many times in certain embodiments, e.g., and is the most essential part of the computation.

Since the encryption is based on encrypting counters, this can be done backwards, e.g., when the reverse indication (e.g., flag) is set for a section, the accelerator is setup with counter N as the "first" block, and the next counter is derived as counter−1 instead of counter+1 (e.g., decrement instead of increment). In these embodiments, the counter value to encrypt/decrypt any data (e.g., byte) is derived from the byte position (BP) relative to the start of the file, e.g., as 1+floor (BP/16). In certain embodiments, the start byte offset of the block is provided in the descriptor, e.g., any byte within any section within a block can be determined using that information and the section offsets. In certain embodiments, the descriptor provides an indication of the offsets and sizes of each section, e.g., along with additional data like the byte position of this entire compressed block within the overall file/stream.

Thus, the counter for encryption may be processed in a different (e.g., reverse) order due to the cipher definition. In certain embodiments, determining the GHASH is more complex. The construction appears to be serialized where using an input tag from the left and compute the new tag at each cipher-block as:
(tag ^ ciphertext)*H_key mod Poly—>new-tag
where ^ is XOR and mod is the modulo operation that returns the remainder (or signed remainder) of a division, after one number is divided by another.

Suppose an initial tag of 0, hash key of "h_key", and a number of (e.g., cipher) blocks given by size, this following pseudocode computes the tag in the forward direction:

```
tag = 0
for x in range(0, size) :
    y = str_to_uint(cipherdata[16*x:16*(x +1)])
    tag ^= y
    tag = mulred(tag, h_key)
ftag = tag
```

Where the mulred is multiply reduce (for example, multiply two values having the same number of bits and then outputting the resultant with the same number of bits).

This following pseudocode computes the tag in the reverse direction:

```
tag = 0, h = h_key
for z in range(0, size) :
    x = size - z - 1
    y = str_to_uint(cipherdata[16*x:16*(x +1)])
    t = mulred(y, h)
    tag ^= t
    h = mulred(h, h_key)
assert ftag == tag
```

In this example, there is another multiply-reduce operation (the underlined step above) needed per block to support the backward processing. The reason this works can be shown with a simple example with 3 cipher blocks (c1, c2, and c3) (e.g., each being 16 Bytes of data):
In the forward direction, compute:
tag=((c1*h_key^c2)*h_key^c3)*h_key
where ^ is XOR (e.g., in Python programming language). If expanded out, this is equivalent to:
tag=c1*h_key$^3$^c2*h_key$^2$^c3*h_key
Where h_key$^3$ is the hash key (e.g., provided as an input) to the third power, etc.

Going backwards, if continuing to calculate powers of h_key (e.g., in the underlined step above), this calculates the same tag.

The above pseudocode shows that a hardware accelerator (e.g., operations circuit) is capable of calculating a local tag for a given section of some size assuming there is no incoming tag from the left. It can be done in either direction as shown (e.g., for data encrypted in the order of c1, c2, and c3, the data can be read/processed in reverse order of c3, c2, and c1). This functionality (e.g., implemented as logic circuitry) can be called by top-level logic for each section (e.g., the four sections mentioned in the example above). For example, with each of multiple instances of decryption/decompression circuit 124 processing a corresponding section.

In certain embodiments, control logic circuit (e.g., control logic circuit 136 in FIG. 1) will handle the final tag creation of the N sections. In certain embodiments, an accelerator computes any of the tags for the N sections in any random order, either forwards or backwards. When each section s is done, those tag(s), h_key$^{size(i)}$, etc., may be stored in a table, e.g., as fields called <tag, hpower>. For example, where "size" in h_key$^{size(i)}$ is the number of (e.g., cipher) blocks in that section with index i. For example, if a literal stream section (backward direction) has 150 blocks, in the course of determining the tag (e.g., computed tag according to the expanded out example above in the right to left order), the value of h_key to the 150$^{th}$ power is already determined, so that value may be stored in the table. The table may be partial tag table(s) 138 in FIG. 1.

Partial tag table may take the following form (e.g., including any field or combination of fields):

| Partial Tag Table for N sections | | | |
|---|---|---|---|
| section | Computed tag | Power of hash key | Valid bit |
| 0 | Tag(0) | h_key$^{size(0)}$ | |
| ... | | | |
| N-1 | Tag(N-1) | h_key$^{size(N-1)}$ | |

For small values of N, this table may utilize a (e.g., very) small amount of memory storage (e.g., 32*N number of bytes) as it is independent of the size of each section. A corresponding valid bit may be stored for each section as that section (e.g., processed separately) is completed, e.g., via a respective decryption/decompression circuit 124.

When the tags (etc.) for all N sections (e.g., for a job or a single compression block) are done (e.g., as indicated by their corresponding valid bits being set), accelerator is to calculate the final tag (e.g., authentication tag), e.g., recall the assumption above that the there is no incoming tag from the left. At this point, the accelerator can then correct the data to remove that assumption. For example, by determining the final tag (e.g., in the encoded order) from the table as:

```
tag=init_tag_into_block
for x in range(0, N) :
    tag = mulred(tag, table(x).hpower) ^ table(x).tag
```

That may also be for a range of 0 to N−1, depending on how loops end in certain programming.

In certain embodiments, the basic idea is that a local tag is computed for each section in any order, and then the top-level logic stitches the tags together in order (e.g., from left to right). Note that in certain embodiments, the final GHASH tag may utilize further operations that are applied to the tag computed above, e.g., but those are done once at the end of the stream and do not affect this disclosure. As an example, two (or more) tags can be stitched together that are: (i) "forward" tag with a "forward" tag, (ii) "forward" tag with a "reverse" tag, (iii) "reverse" tag with a "forward" tag, or (iv) (i) "reverse" tag with a "reverse" tag. As another example, given a starting tag and any forward/reverse partial tag, embodiments herein compute a new tag that can serve as starting tag for iterative computations or a final tag.

In certain embodiments, the authentication tag is used to perform an authentication check of the decrypted data (e.g., where it passes authentication if the check matches and fails otherwise).

In certain embodiments, the logic circuitry to implement this disclosure is located within one or more (e.g., any combination) of: DMA circuit 122, decryption (e.g., and decompression) circuit 124, and control logic circuit 136 in FIG. 1. In one embodiment, A decryption decompression circuit 124 has a decrypt pre-stage that will be activated for a combined decrypt-decompress operation. In certain embodiments, the control logic circuit 136 and DMA circuit 122 manage the forward/backward reading of various streams and sends them into the "source1" or "source2" inputs (see, e.g., FIG. 4) of a decryption and decompression operations circuit (e.g., pipeline). In certain embodiments, the control logic circuit 136 and/or DMA circuit 122 have the top-level logic circuitry to finalize the tag construction for the block after partial sections are done (e.g., in any order). In certain embodiments, the decryption and decompression are (e.g., simultaneously) performed without waiting for the whole section to decrypt (or for any tag calculation), e.g., in real time.

Certain embodiments herein are directed to hardware (for example, an accelerator circuit, e.g., its control logic circuitry) that selectively decrypts (e.g., just) compressed-block headers to locate all offsets of the sections in a block, e.g., and constructs a descriptor with that information. Certain embodiments herein are directed to software that selectively decrypts just compressed-block headers to locate all offsets of the sections in a block, e.g., and constructing a descriptor with that information. Certain embodiments herein are directed to hardware (for example, an accelerator circuit, e.g., its control logic circuitry) that constructs a job with a single or N compressed blocks. Certain embodiments herein are directed to hardware (for example, an accelerator circuit, e.g., its control logic circuitry) that feeds the tag from job N−1 as input to job N. Certain embodiments herein are directed to hardware (for example, an accelerator circuit, e.g., its control logic circuitry) that checks the authentication tag integrity at the end of all jobs of the file/stream.

Further Extensions

Embodiments herein can be extended to have everything managed in the hardware accelerator, e.g., as opposed to software parsing block-header/meta-data. In one embodiment, the hardware accelerator manages a (e.g., very large) file decode (e.g., with multiple blocks/frames) with no host processor (e.g., CPU) assist.

Embodiments herein may be utilized for other encryption schemes, e.g., those where decryption is parallelizable and where the MAC calculation is either absent or parallelizable, for example, this disclosure may be utilized for modes such as AES Cipher FeedBack (AES-CFB) and AES ciphertext stealing (AES-XTS). Certain embodiments herein may not be utilized with Secure Hash Algorithms (SHA) standard(s).

Further Discussion of a Zstandard Format

In certain embodiments, the underlined fields below are what are needed to find the various offsets and lengths of different sections within blocks.

An example structure of a single Zstandard frame is following:

| Magic_Number | Frame_Header | Block | [blocks] | [Content_Checksum] |
|---|---|---|---|---|
| 4 bytes | 2-14 bytes | n bytes | | 0-4 bytes |

An example structure of a block is as follows:

| Block_Header | Block_Content |
|---|---|
| 3 bytes | n bytes |

An example Block_Header uses 3 bytes, written using little-endian convention and contains 3 fields:

| Last_Block | Block_Type | Block_Size |
|---|---|---|
| bit 0 | bits 1-2 | bits 3-23 |

In one embodiment, when Block_Type is Compressed_Block or Raw_Block, Block_Size is the size of Block_Content (hence excluding Block_Header), when Block_Type is RLE_Block, since Block_Content's size is always 1, Block_Size represents the number of times this byte must be repeated, and Block_Size is limited by Block_Maximum_Size.

In certain embodiments, compressed blocks are made up Literal Section followed by Sequences section. Literals can be stored uncompressed or compressed using Huffman prefix codes. When compressed, an optional tree description can be present, followed by 1 or 4 streams.

| Literals Section Hdr | Tree | JT | S1 | [S2] | [S3] | [S4] |
|---|---|---|---|---|---|---|

In one embodiment, a header is in charge of describing how literals are packed, e.g., it is a byte-aligned variable-size bitfield, ranging from 1 to 5 bytes, using little-endian convention.

An example Literals_Section_Header is:

| Literals_Block_Type | Size_Format | Regenerated_Size | [Compressed_Size] |
|---|---|---|---|
| 2 bits | 1-2 bits | 5-20 bits | 0-18 bits |

In one embodiment, the Sequences_Section regroups all symbols required to decode commands. There are 3 symbol types: literals lengths, offsets, and match lengths, e.g., and they are encoded together, interleaved, in a single bitstream.

An example Sequences_Section starts by a header, followed by optional probability tables for each symbol type, followed by the bitstream:

| Sequence_Section_Hdr | [Lit_Len_Table] | [Offset_Table] | [Match_Len_Table] | bitStream |
|---|---|---|---|---|

FIG. 5 is a flow diagram illustrating operations 500 of a method of decryption according to embodiments of the disclosure. Some or all of the operations 500 (or other processes described herein, or variations, and/or combinations thereof) are performed under the control of a computer system (e.g., an accelerator thereof). The operations 500 include, at block 502, sending, by a hardware processor core of a system, a descriptor comprising an indication of a hash key and encrypted data to be decrypted to an accelerator circuit of the system coupled to the hardware processor core. The operations 500 further include, at block 504, in response to receiving the descriptor, determining if the encrypted data is to be read in an encrypted order or a reverse order from the encrypted order by the accelerator circuit. The operations 500 further include, at block 506, in response to the determining that the encrypted data is to be read in the reverse order, generating a resultant authentication tag in the reverse order for the encrypted data based at least in part on the hash key by the accelerator circuit without reordering the encrypted data in the reverse order into the encrypted order.

The operations 500 further include, at block 508, in response to the determining that the encrypted data is to be read in the encrypted order, generating the resultant authentication tag in the encrypted order for the encrypted data based at least in part on the hash key by the accelerator circuit. The operations 500 further include, at block 510, writing the resultant authentication tag to storage.

Figure 6:
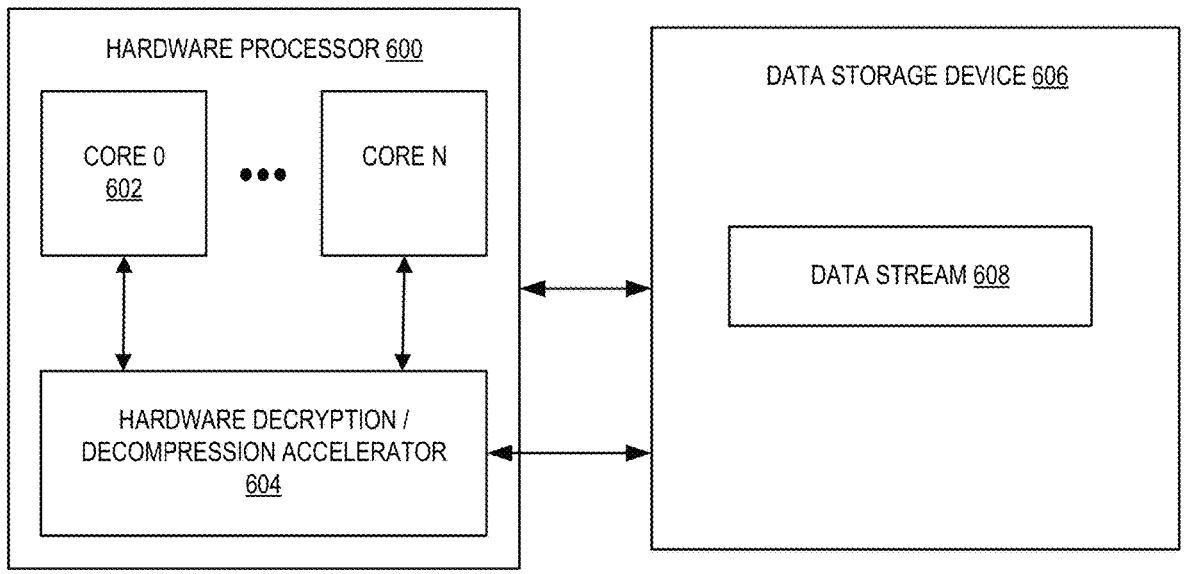
FIG. 6 illustrates a hardware processor with a hardware decryption and/or decompression accelerator according to embodiments of the disclosure.

FIG. 6 illustrates a hardware processor 600 with a hardware decryption and/or decompression accelerator 604 according to embodiments of the disclosure. Hardware processor 600 (e.g., core 602) may receive a request (e.g., from software) to perform a decryption and/or decompression thread (e.g., operation) and may offload (e.g., at least part of) the decryption and/or decompression thread (e.g., operation) to a hardware accelerator (e.g., hardware decryption and/or decompression accelerator 604). Hardware processor 600 may include one or more cores (0 to N). In one embodiment, each core may communicate with (e.g., be coupled to) hardware decompression accelerator 604. In one embodiment, each core may communicate with (e.g., be coupled to) one of multiple hardware decompression accelerators. Core (s), accelerator(s), and data storage device 606 may communicate (e.g., be coupled) with each other. Arrows indicate two-way communication (e.g., to and from a component), but one way communication may be used. In one embodiment, a (e.g., each) core may communicate (e.g., be coupled) with the data storage device, for example, storing and/or outputting a data stream 608. Hardware accelerator may include any hardware (e.g., circuit or circuitry) discussed herein. In one embodiment, an (e.g., each) accelerator may communicate (e.g., be coupled) with the data storage device, for example, to receive an encrypted, compressed data stream.

Figure 7:
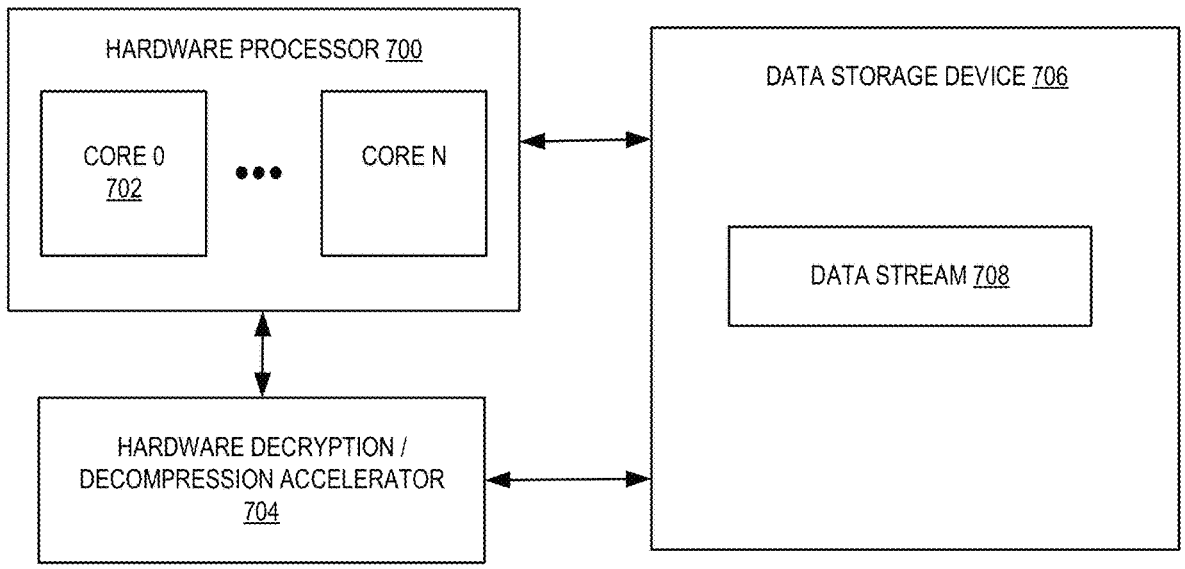
FIG. 7 illustrates a hardware processor and a hardware decryption and/or decompression accelerator according to embodiments of the disclosure.

FIG. 7 illustrates a hardware processor 700 and a hardware decryption and/or decompression accelerator 704 according to embodiments of the disclosure. In one embodiment, a hardware decryption and/or decompression accelerator is on die with a hardware processor. In one embodiment, a hardware decryption and/or decompression accelerator is off die of a hardware processor. In one embodiment, system including at least a hardware processor 700 and a hardware decryption and/or decompression accelerator 704 are a system on a chip (SoC). Hardware processor 700 (e.g., core 702) may receive a request (e.g., from software) to perform a decryption and/or decompression thread (e.g., operation) and may offload (e.g., at least part of) the decryption and/or decompression thread (e.g., operation) to a hardware accelerator (e.g., hardware decryption and/or decompression accelerator 704). Hardware processor 700 may include one or more cores (0 to N). In one embodiment, each core may communicate with (e.g., be coupled to) hardware decryption and/or decompression accelerator 704. In one embodiment, each core may communicate with (e.g., be coupled to) one of multiple hardware decryption and/or decompression accelerators. Core(s), accelerator(s), and data storage device 706 may communicate (e.g., be coupled) with each other. Arrows indicate two-way communication (e.g., to and from a component), but one way communication may be used. In one embodiment, a (e.g., each) core may communicate (e.g., be coupled) with the data storage device, for example, storing and/or outputting a data stream 708. Hardware accelerator may include any hardware (e.g., circuit or circuitry) discussed herein. In one embodiment, an (e.g., each) accelerator may communicate (e.g., be coupled) with the data storage device, for example, to receive an encrypted, compressed data stream. Data stream 708 (e.g., encoded, compressed data stream) may be previously loaded into data storage device 706, e.g., by a hardware compression accelerator or a hardware processor.

Figure 8:
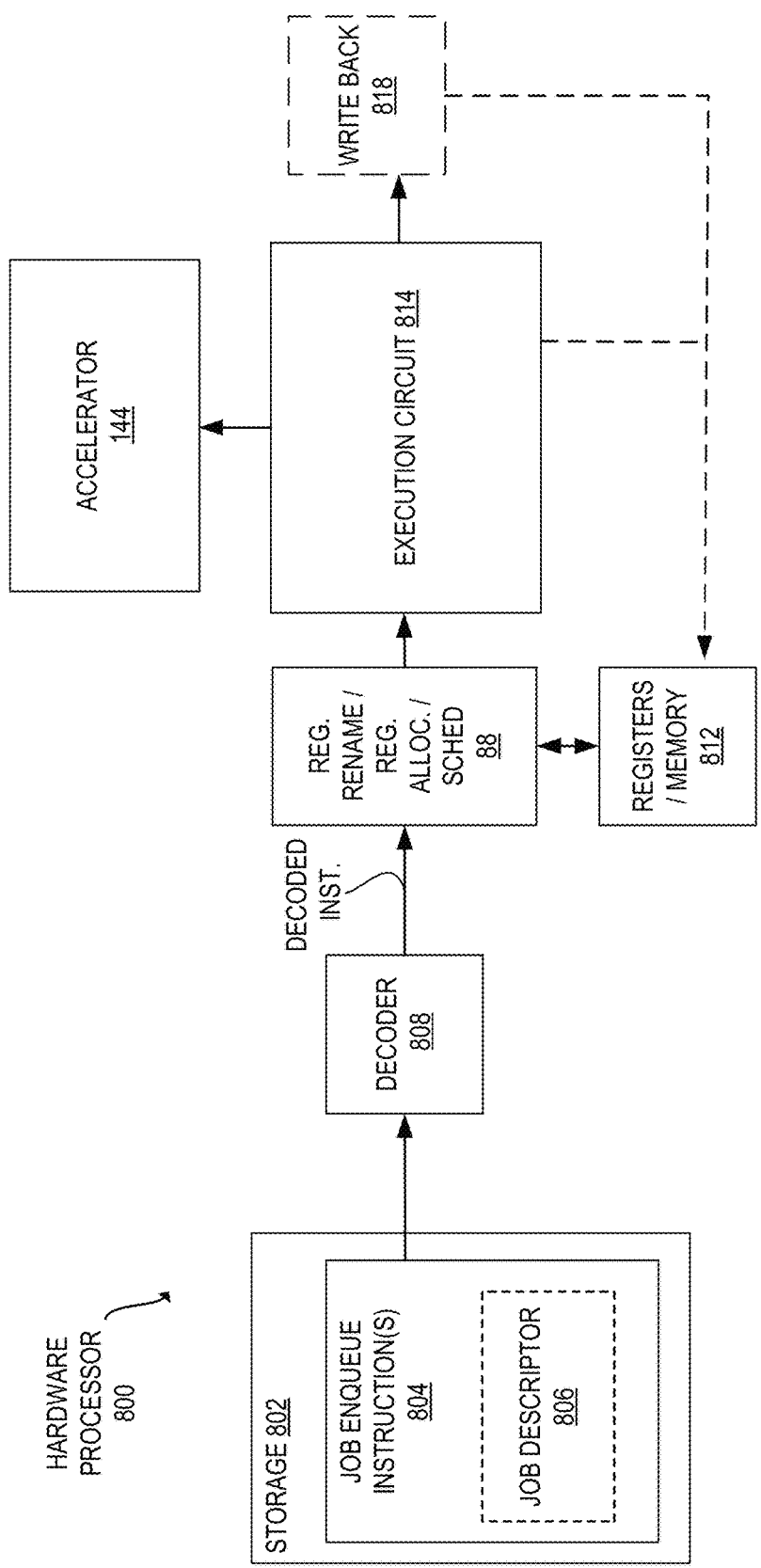
FIG. 8 illustrates a hardware processor coupled to storage that includes one or more job enqueue instructions according to embodiments of the disclosure.

FIG. 8 illustrates a hardware processor 800 coupled to storage 802 that includes one or more job enqueue instructions 804 according to embodiments of the disclosure. In certain embodiments, job enqueue instruction is according to any of the disclosure herein. In certain embodiments, job enqueue instruction 804 identifies a job descriptor 806 (e.g., and the (e.g., logical) MMIO address of an accelerator.

In one embodiment, e.g., in response to a request to perform an operation, the instruction (e.g., macro-instruction) is fetched from storage 802 and sent to decoder 808. In the depicted embodiment, the decoder 808 (e.g., decoder circuit) decodes the instruction into a decoded instruction (e.g., one or more micro-instructions or micro-operations). The decoded instruction is then sent for execution, e.g., via scheduler circuit 810 to schedule the decoded instruction for execution.

In certain embodiments, (e.g., where the processor/core supports out-of-order (OoO) execution), the processor includes a register rename/allocator circuit 810 coupled to register file/memory circuit 812 (e.g., unit) to allocate resources and perform register renaming on registers (e.g., registers associated with the initial sources and final destination of the instruction). In certain embodiments, (e.g., for out-of-order execution), the processor includes one or more scheduler circuits 810 coupled to the decoder 808. The scheduler circuit(s) may schedule one or more operations associated with decoded instructions, including one or more operations decoded from a job enqueue instruction 804, e.g., for offloading execution of an operation to accelerator 144 by the execution circuit 814.

In certain embodiments, a write back circuit 818 is included to write back results of an instruction to a destination (e.g., write them to a register(s) and/or memory), for example, so those results are visible within a processor (e.g., visible outside of the execution circuit that produced those results).

One or more of these components (e.g., decoder 808, register rename/register allocator/scheduler 810, execution circuit 814, registers (e.g., register file)/memory 812, or write back circuit 818) may be in a single core of a hardware processor (e.g., and multiple cores each with an instance of these components).

Figure 9:
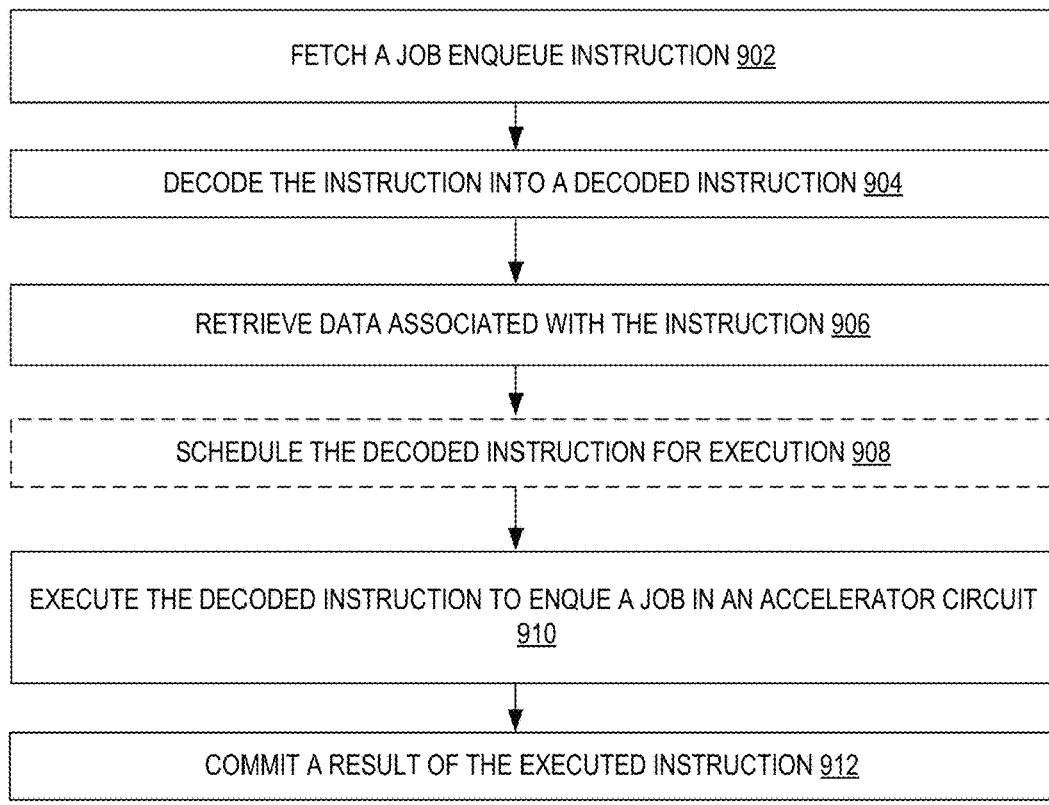
FIG. 9 is a flow diagram illustrating operations of a method for processing a job enqueue instruction according to embodiments of the disclosure.

FIG. 9 is a flow diagram illustrating operations 900 of a method for processing a job enqueue instruction according to embodiments of the disclosure. A processor (e.g., or processor core) may perform operations 900 of method, e.g., in response to receiving a request to execute an instruction from software. Depicted operations 900 includes processing a "job enqueue" instruction by performing a: fetch of an instruction (e.g., having an instruction opcode corresponding to the job enqueue mnemonic) 902, decode of the instruction into a decoded instruction 904, retrieve data associated with the instruction 906, (optionally) schedule the decoded instruction for execution 908, execute the decoded instruction to enqueue a job in an accelerator circuit 910, and commit a result of the executed instruction 912.

FIG. 10 illustrates an example format of a descriptor 1000 according to embodiments of the disclosure. Descriptor 1000 may include any of the depicted fields, for example, with PASID being Process Address Space ID, e.g., to identify accelerator 144 in FIG. 1. In certain embodiments, operation code 1002 is a value that indicates an (e.g., decryption and/or decompression) operation where a single descriptor 1000 identifies the source address and the destination address. In certain embodiments, a field of the descriptor 1000 (e.g., one or more of operation-specific fields) indicates if the decryption and/or decompression is to occur in forward or reverse as discussed herein.

Exemplary architectures, systems, etc. that the above may be used in are detailed below. Exemplary instruction formats that may cause enqueuing of a job for an accelerator are detailed below.

At least some embodiments of the disclosed technologies can be described in view of the following examples:

Example 1. An apparatus comprising:
a hardware processor core; and
an accelerator circuit coupled to the hardware processor core, the accelerator circuit to:
in response to a descriptor, comprising an indication of a hash key and encrypted data to be decrypted, from the hardware processor core, perform a determination that the encrypted data is to be read in an encrypted order or a reverse order from the encrypted order,
in response to the determination that the encrypted data is to be read in the reverse order, generate a resultant authentication tag in the reverse order for the encrypted data based at least in part on the hash key without reordering the encrypted data in the reverse order into the encrypted order, and,
in response to the determination that the encrypted data is to be read in the encrypted order, generate the resultant authentication tag in the encrypted order for the encrypted data based at least in part on the hash key.

Example 2. The apparatus of example 1, wherein the accelerator circuit is to, in response to the descriptor, generate a first authentication tag in the encrypted order for a first plurality of cipher blocks of the encrypted data, generate a second authentication tag in the reverse order for a second plurality of cipher blocks of the encrypted data, and combine the first authentication tag and the second authentication tag into the resultant authentication tag.

Example 3. The apparatus of example 2, wherein the accelerator circuit is to, in response to the descriptor, populate a partial tag table with the first authentication tag and set a first valid bit and, separately, the second authentication tag and set a second valid bit, and combine the first authentication tag and the second authentication tag into the resultant authentication tag in response to the first valid bit and the second valid bit being set.

Example 4. The apparatus of example 3, wherein the accelerator circuit is to, in response to the descriptor, populate the partial tag table with a first value of the hash key to a power of a number of the first plurality of cipher blocks, and with a second value of the hash key to a power of a number of the second plurality of cipher blocks, and combine the first authentication tag and the second authentication tag into the resultant authentication tag based at least in part on the first value and the second value.

Example 5. The apparatus of example 2, wherein the descriptor comprises at least one field that indicates the first plurality of cipher blocks is to be read in the encrypted order, and the second plurality of cipher blocks is to be read in the reverse order from the encrypted order.

Example 6. The apparatus of example 1, wherein the descriptor comprises a field that indicates the encrypted data is to be read in the reverse order from the encrypted order.

Example 7. The apparatus of example 1, wherein the accelerator circuit is further to, in response to the descriptor, decrypt the encrypted data into decrypted data and perform an authentication check of the decrypted data based at least in part on the resultant authentication tag for the encrypted data read (e.g., streamed) in the reverse order.

Example 8. The apparatus of example 7, wherein the accelerator circuit is further to, in response to the descriptor, begin a decompress of the decrypted data into decompressed data without waiting for completion of the decrypt of the encrypted data into decrypted data.

Example 9. A method comprising:
sending, by a hardware processor core of a system, a descriptor comprising an indication of a hash key and encrypted data to be decrypted to an accelerator circuit of the system coupled to the hardware processor core;
in response to receiving the descriptor, determining if the encrypted data is to be read in an encrypted order or a reverse order from the encrypted order by the accelerator circuit;
in response to the determining that the encrypted data is to be read in the reverse order, generating a resultant authentication tag in the reverse order for the encrypted data based at least in part on the hash key by the accelerator circuit without reordering the encrypted data in the reverse order into the encrypted order;
in response to the determining that the encrypted data is to be read in the encrypted order, generating the resultant authentication tag in the encrypted order for the encrypted data based at least in part on the hash key by the accelerator circuit; and
writing the resultant authentication tag to storage.

Example 10. The method of example 9, further comprising, in response to receiving the descriptor:
generating a first authentication tag in the encrypted order for a first plurality of cipher blocks of the encrypted data by the accelerator circuit;
generating a second authentication tag in the reverse order for a second plurality of cipher blocks of the encrypted data by the accelerator circuit; and
combining the first authentication tag and the second authentication tag into the resultant authentication tag.

Example 11. The method of example 10, further comprising, in response to receiving the descriptor:
populating a partial tag table with the first authentication tag and setting a first valid bit by the accelerator circuit; and
separately, populating the partial tag table with the second authentication tag and setting a second valid bit by the accelerator circuit, wherein the combining the first authentication tag and the second authentication tag into the resultant authentication tag is in response to the first valid bit and the second valid bit being set.

Example 12. The method of example 11, further comprising, in response to receiving the descriptor:
populating the partial tag table with a first value of the hash key to a power of a number of the first plurality of cipher blocks by the accelerator circuit; and
populating the partial tag table with a second value of the hash key to a power of a number of the second plurality of cipher blocks by the accelerator circuit, wherein the combining the first authentication tag and the second authentication tag into the resultant authentication tag is based at least in part on the first value and the second value.

Example 13. The method of example 10, further comprising setting the descriptor to indicate the first plurality of cipher blocks is to be read in the encrypted order, and the second plurality of cipher blocks is to be read in the reverse order from the encrypted order.

Example 14. The method of example 9, further comprising setting the descriptor to indicate the encrypted data is to be read in the reverse order from the encrypted order.

Example 15. The method of example 9, further comprising, in response to receiving the descriptor:

decrypting the encrypted data into decrypted data; and performing an authentication check of the decrypted data based at least in part on the resultant authentication tag for the encrypted data read in the reverse order by the accelerator circuit.

Example 16. The method of example 15, further comprising, in response to receiving the descriptor, begin decompressing the decrypted data into decompressed data by the accelerator circuit without waiting for completion of the decrypting of the encrypted data into decrypted data.

Example 17. An apparatus comprising:
a hardware processor core;
a memory; and
an accelerator circuit coupled to the hardware processor core and the memory, the accelerator circuit to:
in response to a descriptor, comprising an indication of a hash key and encrypted data in the memory to be decrypted, from the hardware processor core, perform a determination that the encrypted data is to be read in an encrypted order or a reverse order from the encrypted order,
in response to the determination that the encrypted data is to be read in the reverse order, generate a resultant authentication tag in the reverse order for the encrypted data based at least in part on the hash key without reordering the encrypted data in the reverse order into the encrypted order, and,
in response to the determination that the encrypted data is to be read in the encrypted order, generate the resultant authentication tag in the encrypted order for the encrypted data based at least in part on the hash key.

Example 18. The apparatus of example 17, wherein the accelerator circuit is to, in response to the descriptor, generate a first authentication tag in the encrypted order for a first plurality of cipher blocks of the encrypted data, generate a second authentication tag in the reverse order for a second plurality of cipher blocks of the encrypted data, and combine the first authentication tag and the second authentication tag into the resultant authentication tag.

Example 19. The apparatus of example 18, wherein the accelerator circuit is to, in response to the descriptor, populate a partial tag table with the first authentication tag and set a first valid bit and, separately, the second authentication tag and set a second valid bit, and combine the first authentication tag and the second authentication tag into the resultant authentication tag in response to the first valid bit and the second valid bit being set.

Example 20. The apparatus of example 19, wherein the accelerator circuit is to, in response to the descriptor, populate the partial tag table with a first value of the hash key to a power of a number of the first plurality of cipher blocks, and with a second value of the hash key to a power of a number of the second plurality of cipher blocks, and combine the first authentication tag and the second authentication tag into the resultant authentication tag based at least in part on the first value and the second value.

Example 21. The apparatus of example 18, wherein the descriptor comprises at least one field that indicates the first plurality of cipher blocks is to be read in the encrypted order, and the second plurality of cipher blocks is to be read in the reverse order from the encrypted order.

Example 22. The apparatus of example 17, wherein the descriptor comprises a field that indicates the encrypted data is to be read in the reverse order from the encrypted order.

Example 23. The apparatus of example 17, wherein the accelerator circuit is further to, in response to the descriptor, decrypt the encrypted data into decrypted data and perform an authentication check of the decrypted data based at least in part on the resultant authentication tag for the encrypted data read in the reverse order.

Example 24. The apparatus of example 23, wherein the accelerator circuit is further to, in response to the descriptor, begin a decompress of the decrypted data into decompressed data without waiting for completion of the decrypt of the encrypted data into decrypted data.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11A:
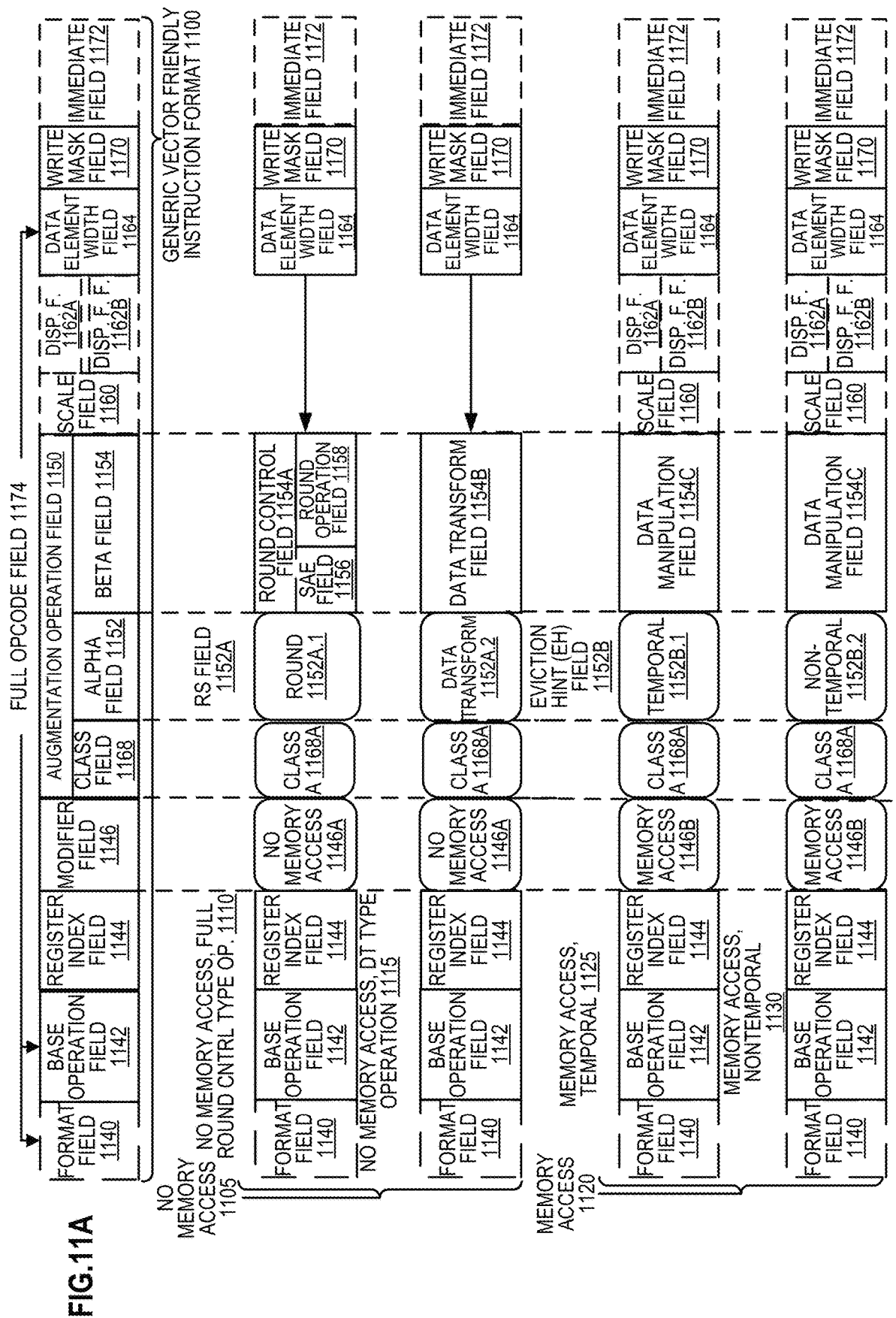
FIG. 11A is a block diagram illustrating a generic vector friendly instruction format and class A instruction templates thereof according to embodiments of the disclosure.
Figure 11B:
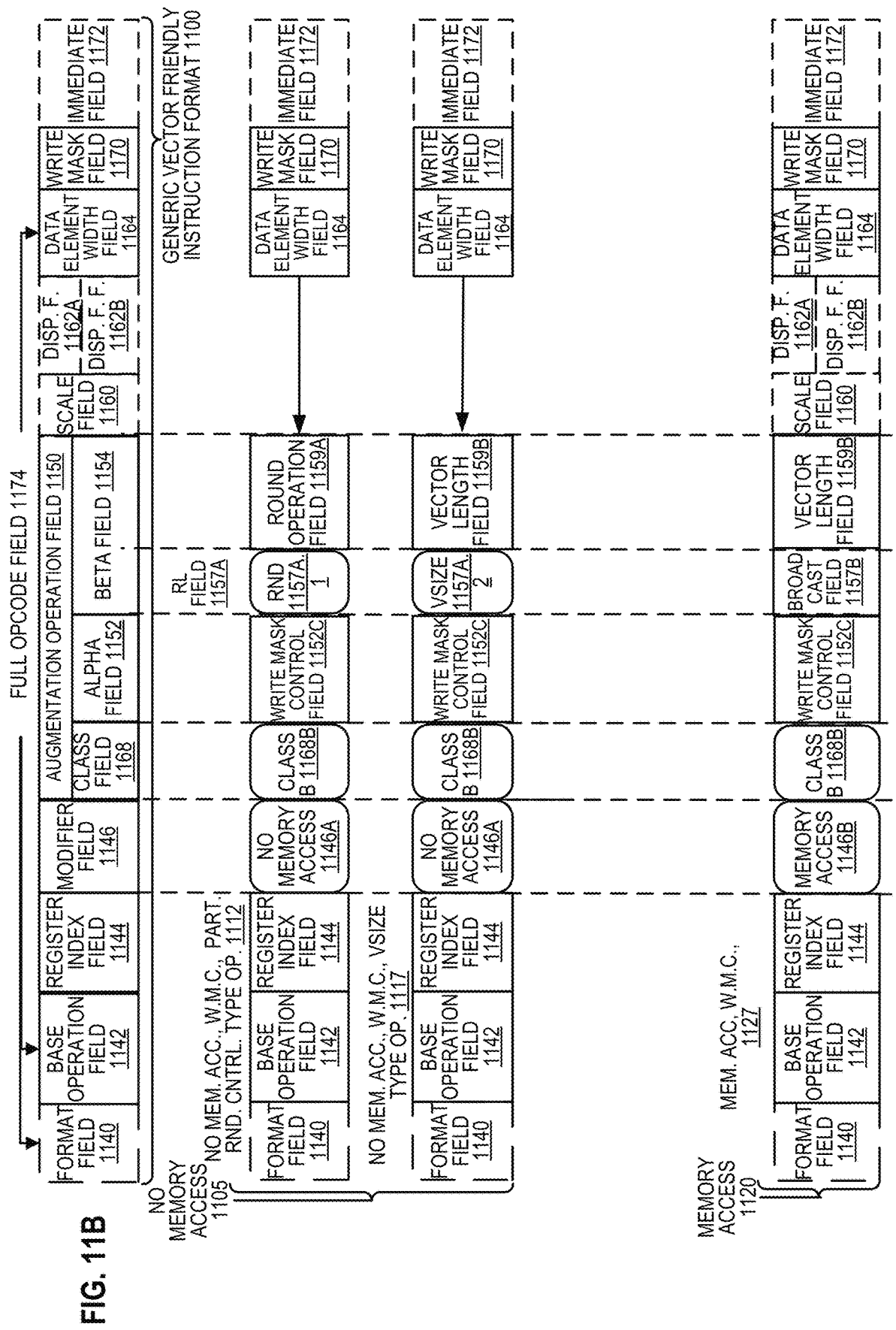
FIG. 11B is a block diagram illustrating the generic vector friendly instruction format and class B instruction templates thereof according to embodiments of the disclosure.

FIGS. 11A-11B are block diagrams illustrating a generic vector friendly instruction format and instruction templates thereof according to embodiments of the disclosure. FIG. 11A is a block diagram illustrating a generic vector friendly instruction format and class A instruction templates thereof according to embodiments of the disclosure; while FIG. 11B is a block diagram illustrating the generic vector friendly instruction format and class B instruction templates thereof according to embodiments of the disclosure. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the disclosure, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*\text{index}+\text{base}$).

Displacement Field 1162A—its content is used as part of memory address generation (e.g., for address generation that uses $2^{scale}*\text{index}+\text{base}+\text{displacement}$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the disclosure are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the disclosure the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the disclosure where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the disclosure where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 12 is a block diagram illustrating an exemplary specific vector friendly instruction format according to embodiments of the disclosure. FIG. 12 shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 12 map are illustrated.

It should be understood that, although embodiments of the disclosure are described with reference to the specific vector friendly instruction format 1200 in the context of the generic vector friendly instruction format 1100 for illustrative purposes, the disclosure is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the disclosure is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0×62 (the unique value used for distinguishing the vector friendly instruction format in one embodiment of the disclosure).

The second-fourth bytes (EVEX Bytes 1-3) include a number of bit fields providing specific capability.

REX field 1205 (EVEX Byte 1, bits [7-5])—consists of a EVEX.R bit field (EVEX Byte 1, bit [7]—R), EVEX.X bit field (EVEX byte 1, bit [6]—X), and 1157 BEX byte 1, bit [5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]—mmmm)—its content encodes an implied leading opcode byte (0F, 0F 38, or 0F 3).

Data element width field 1164 (EVEX byte 2, bit [7]—W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)-the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.U 1168 Class field (EVEX byte 2, bit [2]-U)—If EVEX.U=0, it indicates class A or EVEX.U0; if EVEX.U=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1154 (EVEX byte 3, bits [6:4]-SSS, also known as EVEX.$_{S2-0}$, EVEX.$r_{2-0}$, EVEX.rr1, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of RIM field 1246 may include the following: encoding the instruction operand that references a memory address, or encoding either the destination register operand or a source register operand.

Scale, Index, Base (SIB) Byte (Byte 6)—As previously described, the scale field's 1150 content is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1172 operates as previously described.

Full Opcode Field

FIG. 12B is a block diagram illustrating the fields of the specific vector friendly instruction format 1200 that make up the full opcode field 1174 according to one embodiment of the disclosure. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 12C is a block diagram illustrating the fields of the specific vector friendly instruction format 1200 that make up the register index field 1144 according to one embodiment of the disclosure. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 12D:
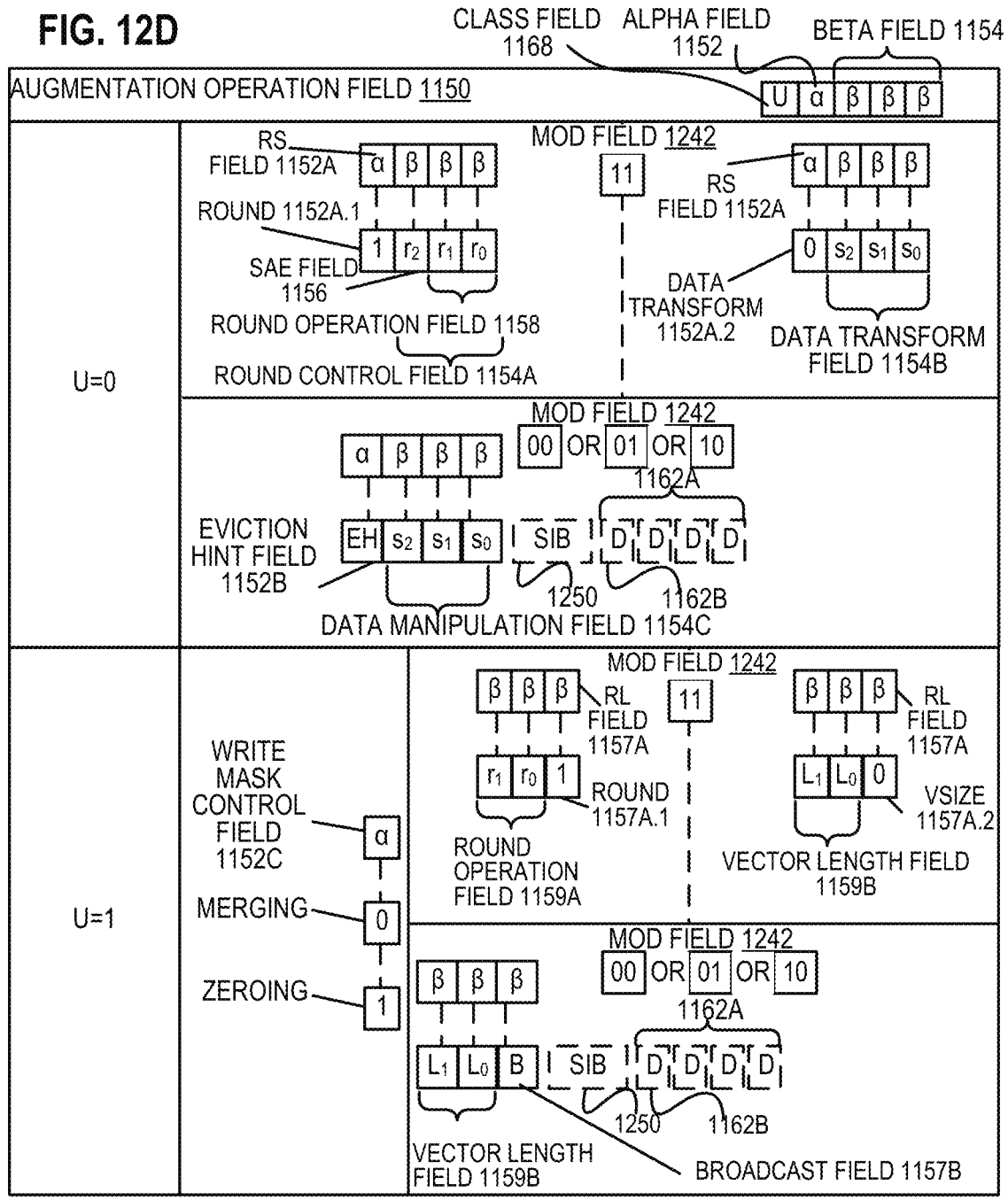
FIG. 12D is a block diagram illustrating the fields of the specific vector friendly instruction format in FIG. 12A that make up the augmentation operation field 1150 according to one embodiment of the disclosure.

FIG. 12D is a block diagram illustrating the fields of the specific vector friendly instruction format 1200 that make up the augmentation operation field 1150 according to one embodiment of the disclosure. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]—EH) is interpreted as the rs field 1152A. When the rs field 1152A contains a 1 (round 1152A.1), the beta field 1154 (EVEX byte 3, bits [6:4]-SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]-SSS) is interpreted as a three bit data transform field 1154B. When U=0 and the MOD field 1242 contains 00, 01, or 10 (signifying a memory access operation), the alpha field 1152 (EVEX byte 3, bit [7]—EH) is interpreted as the eviction hint (EH) field 1152B and the beta field 1154 (EVEX byte 3, bits [6:4]-SSS) is interpreted as a three bit data manipulation field 1154C.

When U=1, the alpha field 1152 (EVEX byte 3, bit [7]—EH) is interpreted as the write mask control (Z) field 1152C. When U=1 and the MOD field 1242 contains 11 (signifying a no memory access operation), part of the beta field 1154 (EVEX byte 3, bit [4]-$S_0$) is interpreted as the RL field 1157A; when it contains a 1 (round 1157A.1) the rest of the beta field 1154 (EVEX byte 3, bit [6-5]-$S_{2-1}$) is interpreted as the round operation field 1159A, while when the RL field 1157A contains a 0 (VSIZE 1157.A2) the rest of the beta field 1154 (EVEX byte 3, bit [6-5]-$S_{2-1}$) is interpreted as the vector length field 1159B (EVEX byte 3, bit [6-5]-$L_{1-0}$). When U=1 and the MOD field 1242 contains 00, 01, or 10 (signifying a memory access operation), the beta field 1154 (EVEX byte 3, bits [6:4]-SSS) is interpreted as the vector length field 1159B (EVEX byte 3, bit [6-5]-$L_{1-0}$) and the broadcast field 1157B (EVEX byte 3, bit [4]-B).

Exemplary Register Architecture

Figure 13:
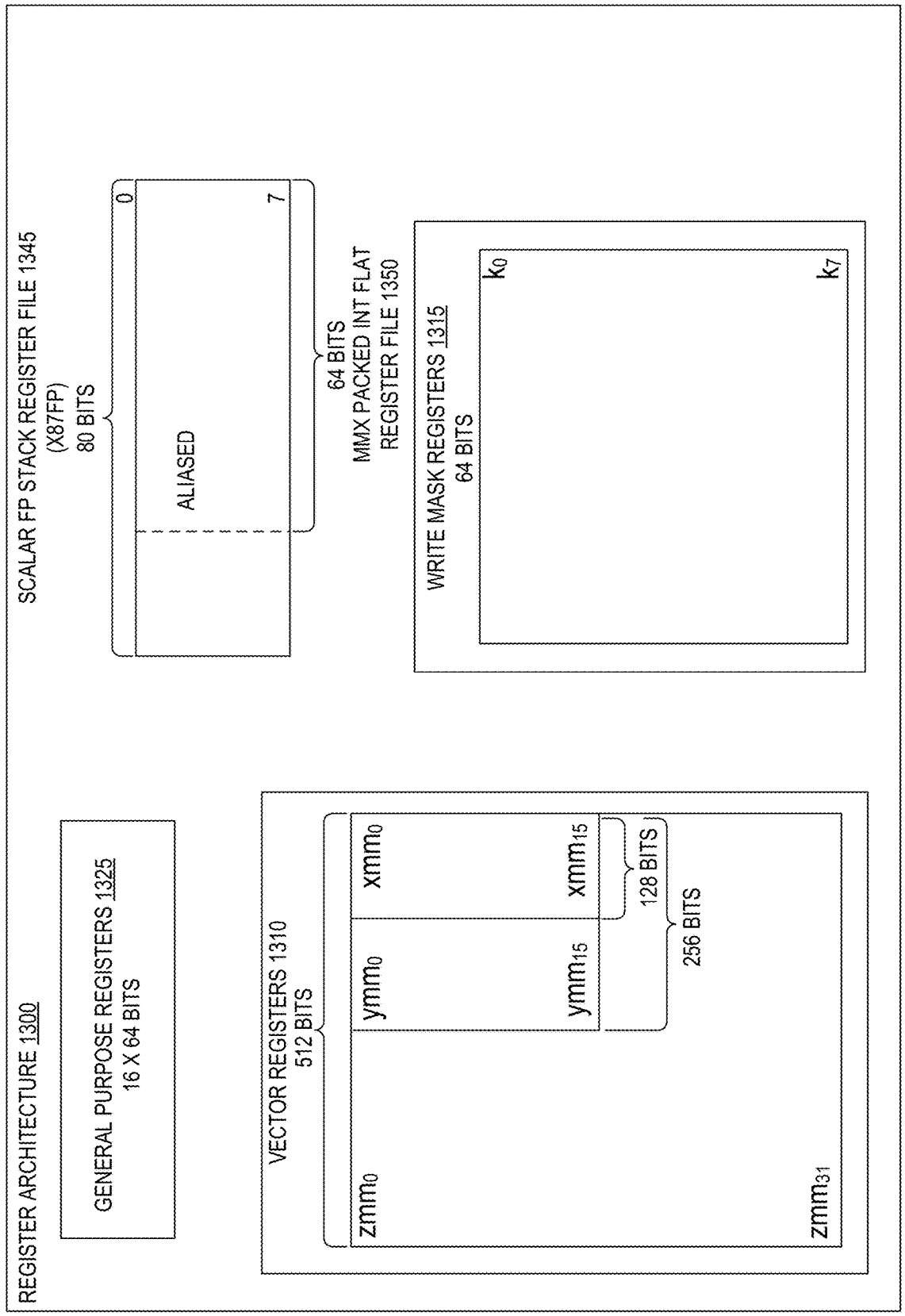
FIG. 13 is a block diagram of a register architecture according to one embodiment of the disclosure.

FIG. 13 is a block diagram of a register architecture 1300 according to one embodiment of the disclosure. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
|---|---|---|---|
| Instruction Templates that do not include the vector length field 1159B | A (Figure 11A; U = 0) | 1110, 1115, 1125, 1130 | zmm registers (the vector length is 64 byte) |
| | B (Figure 11B; U = 1) | 1112 | zmm registers (the vector length is 64 byte) |
| Instruction templates that do include the vector length field 1159B | B (Figure 11B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMIM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 14A:
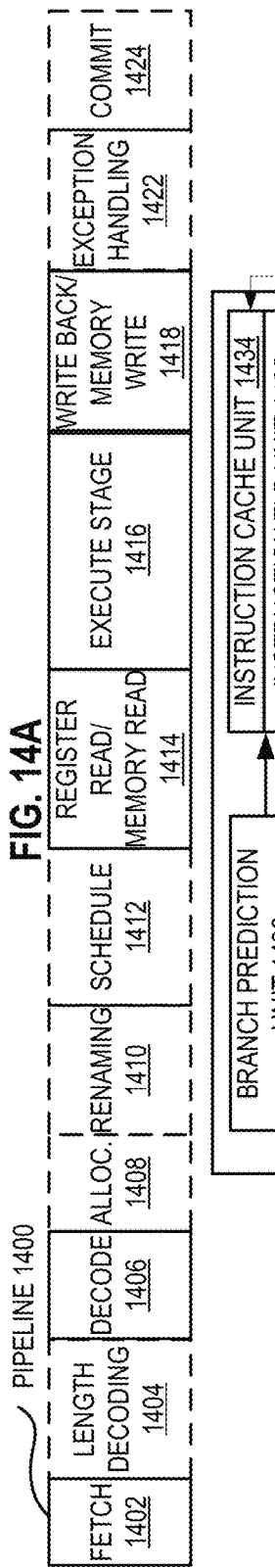
FIG. 14A is a block diagram illustrating both an exemplary in-order pipeline and an exemplary register renaming, out-of-order issue/execution pipeline according to embodiments of the disclosure.
Figure 14B:
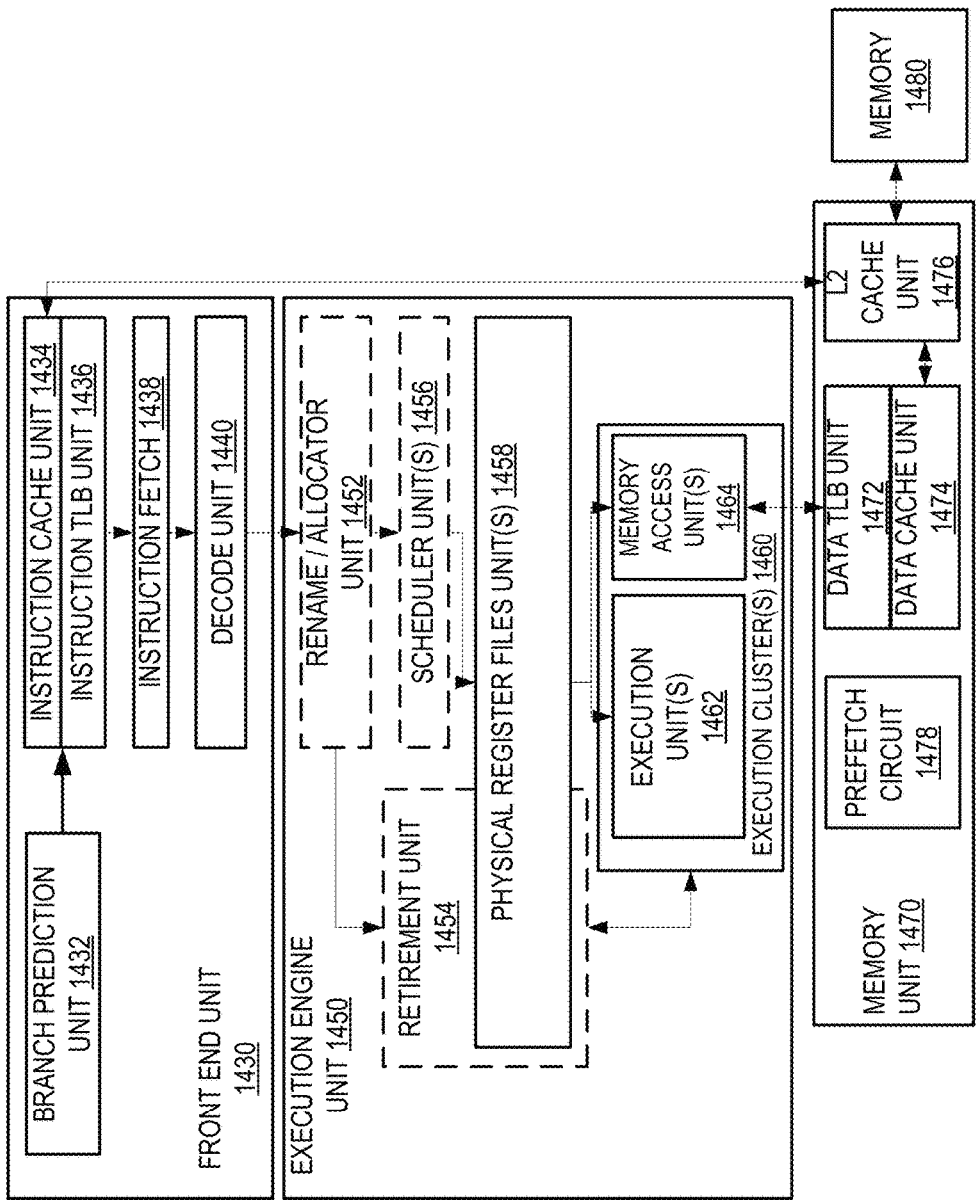
FIG. 14B is a block diagram illustrating both an exemplary embodiment of an in-order architecture core and an exemplary register renaming, out-of-order issue/execution architecture core to be included in a processor according to embodiments of the disclosure.

FIG. 14A is a block diagram illustrating both an exemplary in-order pipeline and an exemplary register renaming, out-of-order issue/execution pipeline according to embodiments of the disclosure. FIG. 14B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macro-instructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

In certain embodiments, a prefetch circuit 1478 is included to prefetch data, for example, to predict access addresses and bring the data for those addresses into a cache or caches (e.g., from memory 1480).

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the disclosure. In one embodiment, an instruction decode unit 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the disclosure may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the disclosure. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
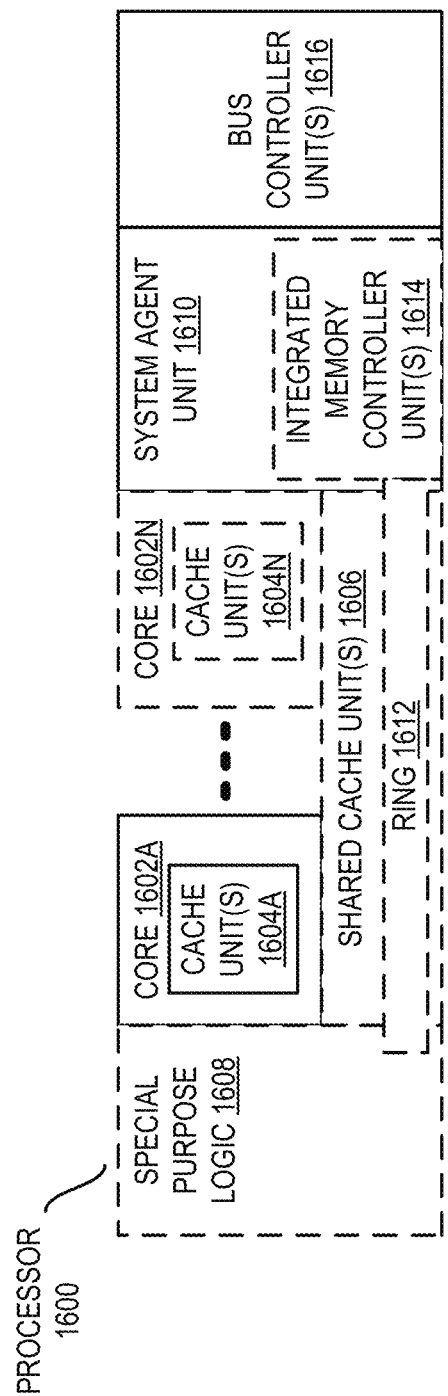
FIG. 16 is a block diagram of a processor that may have more than one core, may have an integrated memory controller, and may have integrated graphics according to embodiments of the disclosure.

FIG. 16 is a block diagram of a processor 1600 that may have more than one core, may have an integrated memory controller, and may have integrated graphics according to embodiments of the disclosure. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
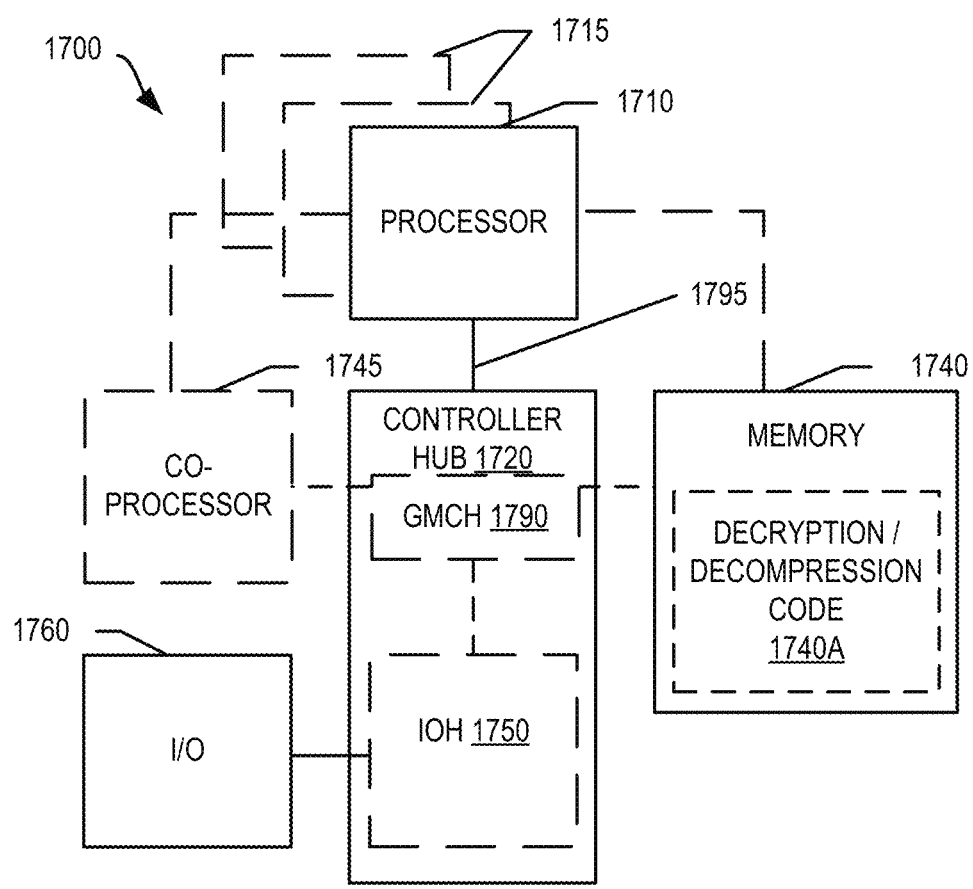
FIG. 17 is a block diagram of a system in accordance with one embodiment of the present disclosure.

Referring now to FIG. 17, shown is a block diagram of a system 1700 in accordance with one embodiment of the present disclosure. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750. Memory 1740 may include decryption (e.g., and decompression) code 1740A, for example, to store code that when executed causes a processor to perform any method of this disclosure.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as Quickpath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
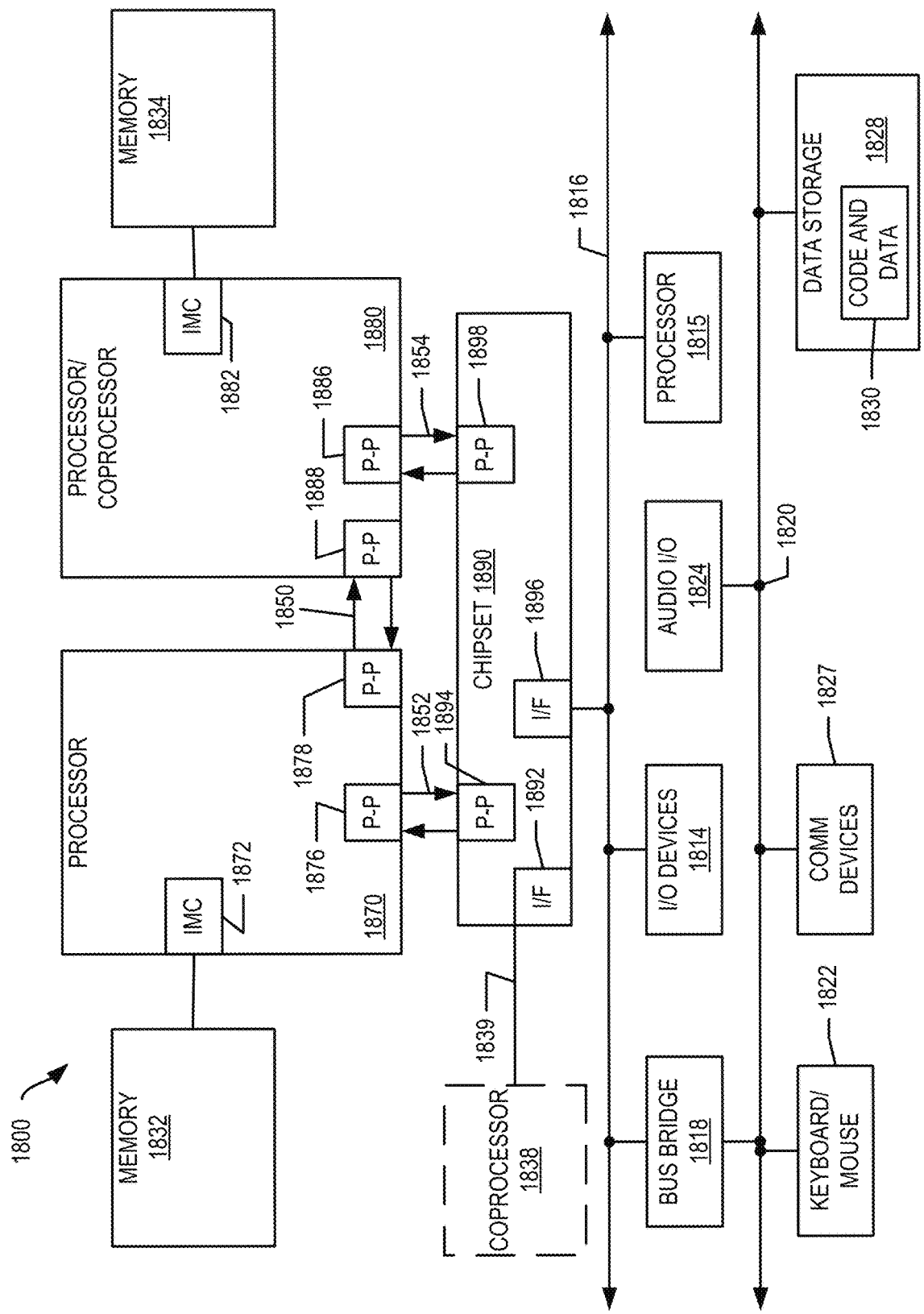
FIG. 18 is a block diagram of a more specific exemplary system in accordance with an embodiment of the present disclosure.

Referring now to FIG. 18, shown is a block diagram of a first more specific exemplary system 1800 in accordance with an embodiment of the present disclosure. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the disclosure, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present disclosure is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
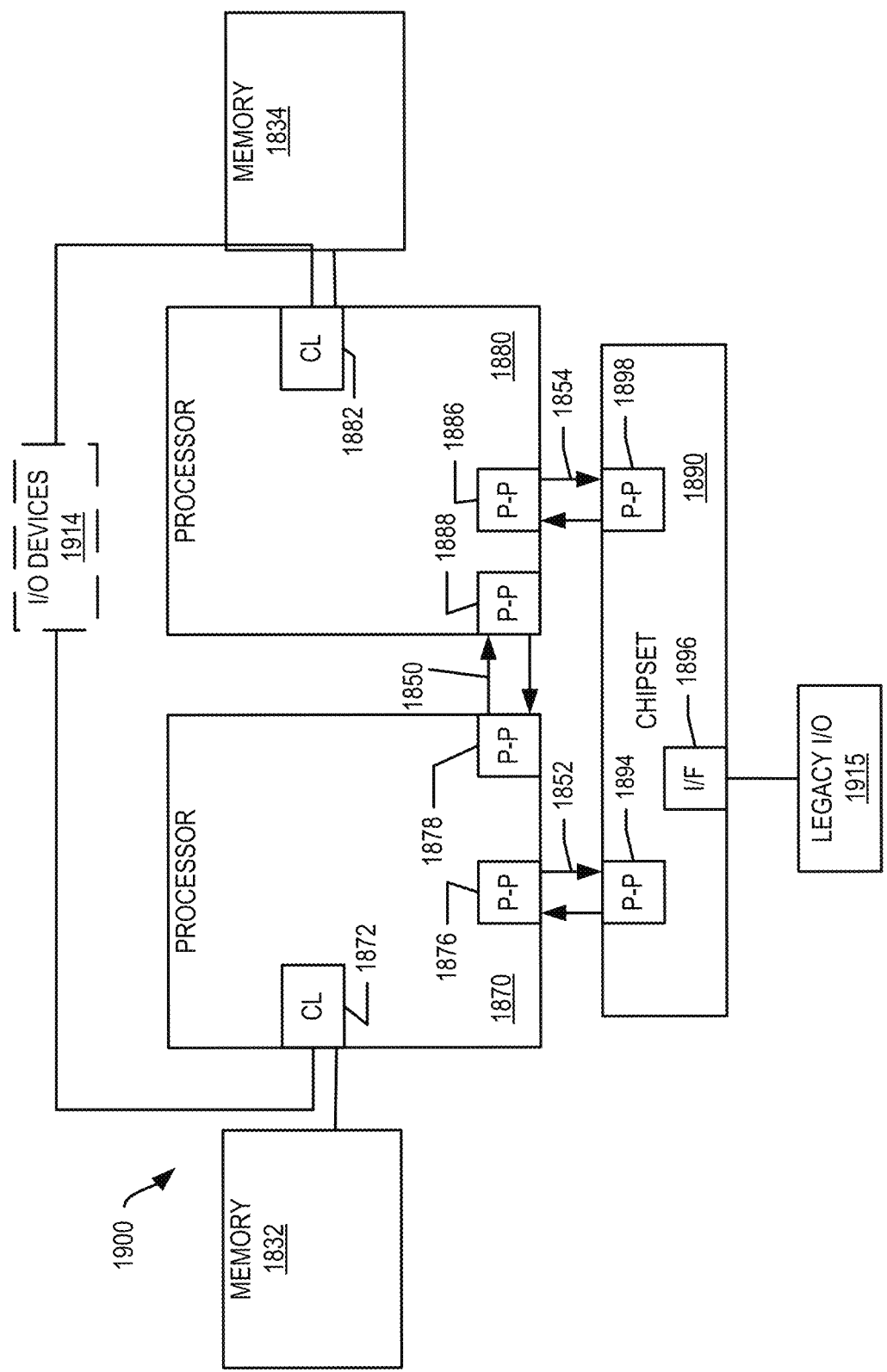
FIG. 19, shown is a block diagram of a second more specific exemplary system in accordance with an embodiment of the present disclosure.

Referring now to FIG. 19, shown is a block diagram of a second more specific exemplary system 1900 in accordance with an embodiment of the present disclosure. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
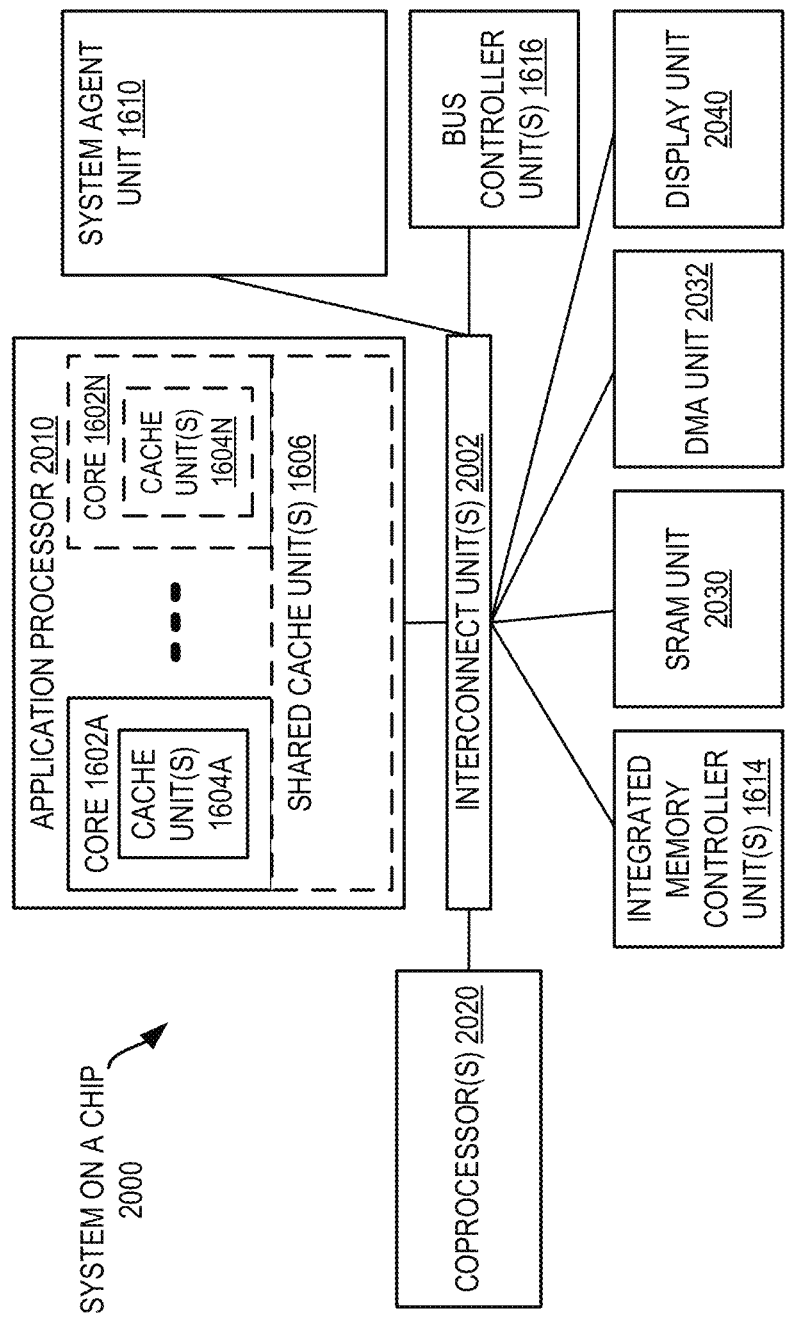
FIG. 20, shown is a block diagram of a system on a chip (SoC) in accordance with an embodiment of the present disclosure.

Referring now to FIG. 20, shown is a block diagram of a SoC 2000 in accordance with an embodiment of the present disclosure. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 1602A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
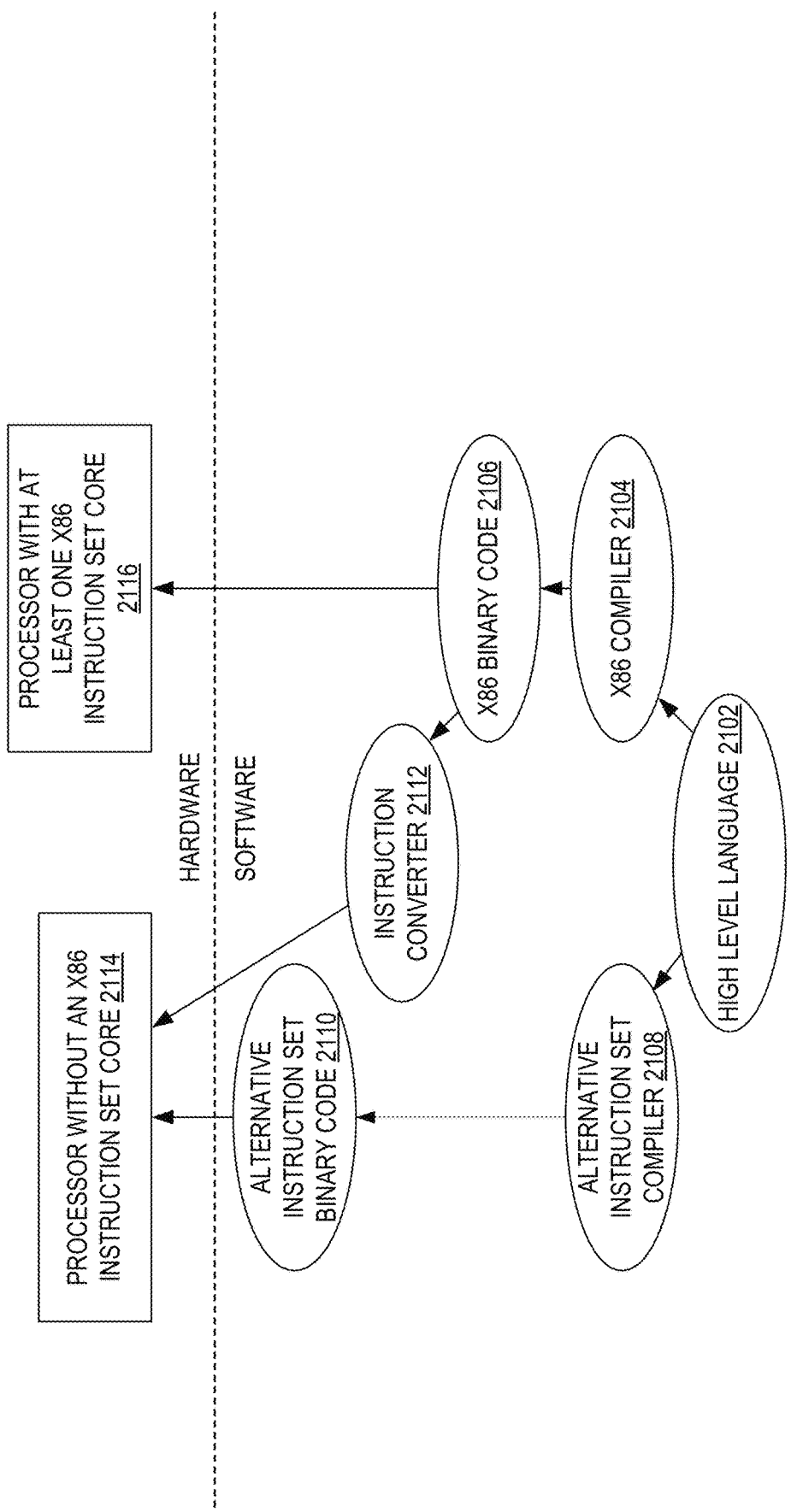
FIG. 21 is a block diagram contrasting the use of a software instruction converter to convert binary instructions in a source instruction set to binary instructions in a target instruction set according to embodiments of the disclosure.

FIG. 21 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, CA and/or that execute the ARM instruction set of ARM Holdings of Sunnyvale, CA). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation, or any other process, allows a processor or other electronic device that does not have an x86 instruction set processor or core to execute the x86 binary code 2106.

What is claimed is:

1. An apparatus comprising:
a hardware processor core; and
an accelerator circuit coupled to the hardware processor core, the accelerator circuit to:
in response to a descriptor, comprising an indication of a hash key and encrypted data to be decrypted, from the hardware processor core, perform a determination that the encrypted data is to be read in an encrypted order or a reverse order from the encrypted order,
in response to the determination that the encrypted data is to be read in the reverse order, generate a resultant authentication tag in the reverse order for the encrypted data based at least in part on the hash key without reordering the encrypted data in the reverse order into the encrypted order, and,
in response to the determination that the encrypted data is to be read in the encrypted order, generate the resultant authentication tag in the encrypted order for the encrypted data based at least in part on the hash key.

2. The apparatus of claim 1, wherein the accelerator circuit is to, in response to the descriptor, generate a first authentication tag in the encrypted order for a first plurality of cipher blocks of the encrypted data, generate a second authentication tag in the reverse order for a second plurality of cipher blocks of the encrypted data, and combine the first authentication tag and the second authentication tag into the resultant authentication tag.

3. The apparatus of claim 2, wherein the accelerator circuit is to, in response to the descriptor, populate a partial tag table with the first authentication tag and set a first valid bit and, separately, the second authentication tag and set a second valid bit, and combine the first authentication tag and the second authentication tag into the resultant authentication tag in response to the first valid bit and the second valid bit being set.

4. The apparatus of claim 3, wherein the accelerator circuit is to, in response to the descriptor, populate the partial tag table with a first value of the hash key to a power of a number of the first plurality of cipher blocks, and with a second value of the hash key to a power of a number of the second plurality of cipher blocks, and combine the first authentication tag and the second authentication tag into the resultant authentication tag based at least in part on the first value and the second value.

5. The apparatus of claim 2, wherein the descriptor comprises at least one field that indicates the first plurality of cipher blocks is to be read in the encrypted order, and the second plurality of cipher blocks is to be read in the reverse order from the encrypted order.

6. The apparatus of claim 1, wherein the descriptor comprises a field that indicates the encrypted data is to be read in the reverse order from the encrypted order.

7. The apparatus of claim 1, wherein the accelerator circuit is further to, in response to the descriptor, decrypt the encrypted data into decrypted data and perform an authentication check of the decrypted data based at least in part on the resultant authentication tag for the encrypted data read in the reverse order.

8. The apparatus of claim 7, wherein the accelerator circuit is further to, in response to the descriptor, begin a decompress of the decrypted data into decompressed data without waiting for completion of the decrypt of the encrypted data into decrypted data.

9. A method comprising:
sending, by a hardware processor core of a system, a descriptor comprising an indication of a hash key and encrypted data to be decrypted to an accelerator circuit of the system coupled to the hardware processor core;
in response to receiving the descriptor, determining if the encrypted data is to be read in an encrypted order or a reverse order from the encrypted order by the accelerator circuit;
in response to the determining that the encrypted data is to be read in the reverse order, generating a resultant authentication tag in the reverse order for the encrypted data based at least in part on the hash key by the accelerator circuit without reordering the encrypted data in the reverse order into the encrypted order;
in response to the determining that the encrypted data is to be read in the encrypted order, generating the resultant authentication tag in the encrypted order for the encrypted data based at least in part on the hash key by the accelerator circuit; and
writing the resultant authentication tag to storage.

10. The method of claim 9, further comprising, in response to receiving the descriptor:
generating a first authentication tag in the encrypted order for a first plurality of cipher blocks of the encrypted data by the accelerator circuit;
generating a second authentication tag in the reverse order for a second plurality of cipher blocks of the encrypted data by the accelerator circuit; and
combining the first authentication tag and the second authentication tag into the resultant authentication tag.

11. The method of claim 10, further comprising, in response to receiving the descriptor:
populating a partial tag table with the first authentication tag and setting a first valid bit by the accelerator circuit; and
separately, populating the partial tag table with the second authentication tag and setting a second valid bit by the accelerator circuit, wherein the combining the first authentication tag and the second authentication tag into the resultant authentication tag is in response to the first valid bit and the second valid bit being set.

12. The method of claim 11, further comprising, in response to receiving the descriptor:

populating the partial tag table with a first value of the hash key to a power of a number of the first plurality of cipher blocks by the accelerator circuit; and
populating the partial tag table with a second value of the hash key to a power of a number of the second plurality of cipher blocks by the accelerator circuit, wherein the combining the first authentication tag and the second authentication tag into the resultant authentication tag is based at least in part on the first value and the second value.

13. The method of claim 10, further comprising setting the descriptor to indicate the first plurality of cipher blocks is to be read in the encrypted order, and the second plurality of cipher blocks is to be read in the reverse order from the encrypted order.

14. The method of claim 9, further comprising setting the descriptor to indicate the encrypted data is to be read in the reverse order from the encrypted order.

15. The method of claim 9, further comprising, in response to receiving the descriptor:
decrypting the encrypted data into decrypted data; and
performing an authentication check of the decrypted data based at least in part on the resultant authentication tag for the encrypted data read in the reverse order by the accelerator circuit.

16. The method of claim 15, further comprising, in response to receiving the descriptor, begin decompressing the decrypted data into decompressed data by the accelerator circuit without waiting for completion of the decrypting of the encrypted data into decrypted data.

17. An apparatus comprising:
a hardware processor core;
a memory; and
an accelerator circuit coupled to the hardware processor core and the memory, the accelerator circuit to:
in response to a descriptor, comprising an indication of a hash key and encrypted data in the memory to be decrypted, from the hardware processor core, perform a determination that the encrypted data is to be read in an encrypted order or a reverse order from the encrypted order,
in response to the determination that the encrypted data is to be read in the reverse order, generate a resultant authentication tag in the reverse order for the encrypted data based at least in part on the hash key without reordering the encrypted data in the reverse order into the encrypted order, and,
in response to the determination that the encrypted data is to be read in the encrypted order, generate the resultant authentication tag in the encrypted order for the encrypted data based at least in part on the hash key.

18. The apparatus of claim 17, wherein the accelerator circuit is to, in response to the descriptor, generate a first authentication tag in the encrypted order for a first plurality of cipher blocks of the encrypted data, generate a second authentication tag in the reverse order for a second plurality of cipher blocks of the encrypted data, and combine the first authentication tag and the second authentication tag into the resultant authentication tag.

19. The apparatus of claim 18, wherein the accelerator circuit is to, in response to the descriptor, populate a partial tag table with the first authentication tag and set a first valid bit and, separately, the second authentication tag and set a second valid bit, and combine the first authentication tag and the second authentication tag into the resultant authentication tag in response to the first valid bit and the second valid bit being set.

20. The apparatus of claim 19, wherein the accelerator circuit is to, in response to the descriptor, populate the partial tag table with a first value of the hash key to a power of a number of the first plurality of cipher blocks, and with a second value of the hash key to a power of a number of the second plurality of cipher blocks, and combine the first authentication tag and the second authentication tag into the resultant authentication tag based at least in part on the first value and the second value.

21. The apparatus of claim 18, wherein the descriptor comprises at least one field that indicates the first plurality of cipher blocks is to be read in the encrypted order, and the second plurality of cipher blocks is to be read in the reverse order from the encrypted order.

22. The apparatus of claim 17, wherein the descriptor comprises a field that indicates the encrypted data is to be read in the reverse order from the encrypted order.

23. The apparatus of claim 17, wherein the accelerator circuit is further to, in response to the descriptor, decrypt the encrypted data into decrypted data and perform an authentication check of the decrypted data based at least in part on the resultant authentication tag for the encrypted data read in the reverse order.

24. The apparatus of claim 23, wherein the accelerator circuit is further to, in response to the descriptor, begin a decompress of the decrypted data into decompressed data without waiting for completion of the decrypt of the encrypted data into decrypted data.

\* \* \* \* \*